United States Patent
Mashimo

(10) Patent No.: US 11,652,946 B2
(45) Date of Patent: May 16, 2023

(54) OPTICAL SCANNING DEVICE AND IMAGE FORMING APPARATUS

(71) Applicant: KYOCERA Document Solutions Inc., Osaka (JP)

(72) Inventor: Takayuki Mashimo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 183 days.

(21) Appl. No.: 17/377,011

(22) Filed: Jul. 15, 2021

(65) Prior Publication Data

US 2022/0026707 A1   Jan. 27, 2022

(30) Foreign Application Priority Data

Jul. 21, 2020 (JP) ............... JP2020-124294

(51) Int. Cl.
  *H04N 1/028* (2006.01)
  *G03G 15/043* (2006.01)
  *G02B 26/12* (2006.01)
  *H04N 1/024* (2006.01)

(52) U.S. Cl.
  CPC ......... *H04N 1/0283* (2013.01); *G02B 26/122* (2013.01); *G03G 15/043* (2013.01); *H04N 1/024* (2013.01); *H04N 1/02895* (2013.01)

(58) Field of Classification Search
  None
  See application file for complete search history.

(56) References Cited

U.S. PATENT DOCUMENTS

2018/0231911 A1*  8/2018  Kurosawa ............... G03G 15/55
2020/0137335 A1*  4/2020  Ohdaira ................ H04L 9/0869

FOREIGN PATENT DOCUMENTS

JP    2019-171693 A    10/2019

* cited by examiner

*Primary Examiner* — Lennin R Rodriguezgonzalez
*Assistant Examiner* — Lennin R Rodriguez
(74) *Attorney, Agent, or Firm* — Studebaker & Brackett PC

(57) ABSTRACT

An optical scanning device includes a light source, a deflector, a random number generator, a selection part, a random number assignment part and an exposure control part. The light source includes a plurality of light emitting parts arranged in a predetermined direction at fixed intervals in a sub-scanning direction. The random number assignment part is configured to assign a random number sequence to each light emitting part constituting a set of target light emitting parts as an index for specifying a timing at which a light emitting time of the set of target light emitting parts is set to a correction value different from a reference value and to update the assignment of the random number sequence at a random number update period. The random number update period coincides with a scanning period of each light emitting part constituting the set of target light emitting parts.

6 Claims, 13 Drawing Sheets

OPTICAL SCANNING DEVICE AND IMAGE FORMING APPARATUS

INCORPORATION BY REFERENCE

This application is based on and claims the benefit of priority from Japanese patent application No. 2020-124294 filed on Jul. 21, 2020, which is incorporated by reference in its entirety.

BACKGROUND

The present disclosure relates to an optical scanning device which scans a circumferential surface of a photosensitive drum with a light beam and an image forming apparatus including the optical scanning device.

An image forming apparatus such as a laser printer and a copying machine is provided with an optical scanning device. The optical scanning device deflects a light beam emitted from a light source by a deflector such as a polygon mirror and scans a circumferential surface of an image carrier such as a photosensitive drum to form an electrostatic latent image on the circumferential surface. For example, there is a multi-beam type optical scanning device provided with a light source in which a plurality of light emitting parts for emitting the light beam is arranged.

In the optical scanning device described above, the two or more light emitting parts capable of emitting the light beam to the same deflection surface of the deflector are selected as two or more target light emitting parts for emitting the light beam used for forming each pixel of the electrostatic latent image, among the plurality of light emitting parts. Thus, even when an accuracy of reflection of the light beam by each deflection surface of the deflector varies, the respective pixels of the electrostatic latent image can be formed without distortion by using the two or more light beams emitted to the same deflection surface. Therefore, it becomes possible to suppress a deterioration of image quality of the electrostatic latent image formed on the circumferential surface of the image carrier.

By the way, when an exposure scanning is performed by making a light emitting time of each light emitting part uniform for each pixel of the electrostatic latent image, ideally, the pixel width in the main scanning direction should be uniform. However, due to variations in the beam diameter of the light beam emitted from the light emitting part, distortion of the optical path of the optical scanning device, or the like, a phenomenon may occur, in which the pixel width in the main scanning direction is not uniform in the electrostatic latent image. In this case, density unevenness occurs in the image formed on a sheet corresponding to the electrostatic latent image formed on the circumferential surface of the image carrier. In order to correct the nonuniformity of the pixel width in the electrostatic latent image, a correction processing (an equal-magnification correction processing) is generally executed for the pixel at a predetermined position on the electrostatic latent image such that the light emitting time of the light emitting part is set to a correction value different from a predetermined reference value. In this case, if the position of the target pixel to be corrected for each scanning in the main scanning direction having a fixed interval in the sub-scanning direction has regularity, for example, if the position is the same position in the main scanning direction, the quality of the image formed on the sheet corresponding to the electrostatic latent image may be deteriorated. Then, it is necessary to make the positions of the target pixels for each scanning in the main scanning direction having a fixed interval in the sub-scanning direction irregular.

In order to make the positions of the target pixels irregular, it is conceivable to adopt a configuration in which a pseudo random number sequence sequentially generated by a random number generator is assigned to the light emitting part as an index for specifying the timing at which the light emitting time of the light emitting part is set as the correction value. It is assumed that such a configuration is simply applied to the optical scanning device provided with the multi-beam type light source. In this case, the pseudo random number sequence is assigned to each of the two or more target light emitting parts emitting the light beam used for forming each pixel of the electrostatic latent image, and the assignment of the pseudo random number sequence is updated every time when the deflection surface to which the light beam is emitted is switched.

In the multi-beam type light source, among the plurality of light emitting parts, in the scanning in the main scanning direction using one deflection surface, the light emitting part which is not selected as the target light emitting part and is set in a light emitting stop state may exist. In the configuration in which the assignment of the pseudo random number sequence is updated every time when the deflection surface is switched, the assignment of the pseudo random number sequence is updated for the light emitting part in the light emitting stop state, in the same manner as the target light emitting part. The light emitting part in the light emitting stop state does not contribute to the scanning in the main scanning direction. Therefore, it can be said that the updating of the assignment of the pseudo random number sequence for the light emitting part in the light emitting stop state is a useless updating.

In a state of the useless updating of the assignment of the pseudo random number sequence, a possibility that the same random number sequence as the already assigned pseudo random number sequence generated at a timing exceeding the random number period preset in the random number generator is assigned to the target light emitting part increases. In this case, the irregularity of the position of the target pixel to be corrected according to the pseudo random number sequence in the electrostatic latent image is inhibited. Then, in the image formed on the sheet corresponding to the electrostatic latent image, a spatial frequency relating to the density unevenness corresponding to the target pixel may be higher than the minimum spatial frequency visible to a person. As a result, the quality of the image on the sheet is deteriorated. Therefore, when the optical path distortion or the like occurs in the optical scanning device, the phenomenon in which the pixel width in the main scanning direction becomes nonuniform in the electrostatic latent image cannot be properly suppressed.

SUMMARY

In accordance with an aspect of the present disclosure, an optical scanning device includes a light source, a deflector, a random number generator, a selection part, a random number assignment part and an exposure control part. The light source includes a plurality of light emitting parts emitting a light beam. The light emitting parts are arranged in a predetermined direction at fixed intervals in a sub-scanning direction. The deflector is formed into a polygonal prism rotating around an axis and has deflection surfaces formed in each side surface of the polygonal prism. The deflection surface reflects the light beam to scan a circumferential surface of an image carrier rotating around an axis with the light beam in a main scanning direction. The random number generator sequentially generates a plurality of pseudo random number sequence with an initial random number sequence having a predetermined bit length as a seed. The pseudo random number sequence has a same bit length as the bit length of the initial random number sequence. The selection part is configured to select the two light emitting parts as a set of target emitting parts among the light emitting parts. The target emitting parts are arranged adjacently to each other in the predetermined direction and are capable of emitting the light beams at the same time to one of the deflection surfaces in order to form one pixel of an electrostatic latent image to be formed on the circumferential surface by the two light beams. The selection part is configured to change a combination of the light emitting parts constituting the set of target light emitting parts for each position of the pixel of the electrostatic latent image in the sub-scanning direction. The random number assignment part is configured to assign the random number sequence selected from the initial random number sequence and the pseudo random number sequences individually to each light emitting part constituting the set of target light emitting parts as an index for specifying a timing at which a light emitting time at the light beam emitting of the set of target light emitting parts is set to a correction value different from a predetermined reference value. The random number assignment part is configured to update the assignment of the random number sequence at a random number update period specified for each light emitting part constituting the set of target light emitting parts. The exposure control part is configured to output a light emitting control signal containing a pulse individually for each light emitting part constituting the set of target light emitting parts and to cause each light emitting part constituting the set of target light emitting parts to emit the two light beams. The pulse serves as an index of a timing for causing each light emitting part constituting the set of target light emitting parts to emit the light beam and has a pulse width which defines the light emitting time and is different between the width corresponding to the reference value and the width corresponding to the correction value. The random number update period specified for each light emitting part constituting the set of target light emitting parts coincides with a scanning period specified for each light emitting part constituting the set of target light emitting parts. The scanning period indicates a scanning period in which the light beam emitted from each light emitting part constituting the set of target light emitting parts scans the circumferential surface in the main scanning direction.

In accordance with an aspect of the present disclosure, an image forming apparatus includes the optical scanning device, the image carrier; and an image forming unit which forms an image corresponding to the electrostatic latent image on a sheet.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an optical scanning device and an image forming apparatus according to one embodiment of the present disclosure will be described. In the following, each direction in the optical scanning device and the image forming apparatus will be described using the XYZ orthogonal coordinate axes. That is, the X direction corresponds to the left-and-right direction (+X is a right, −X is a left), the Y direction corresponds to the front-and-rear direction (+Y is a front, −Y is a rear), and the Z direction corresponds to the upper-and-lower direction (+Z is an upper, −Z is a lower).

Figure 1:
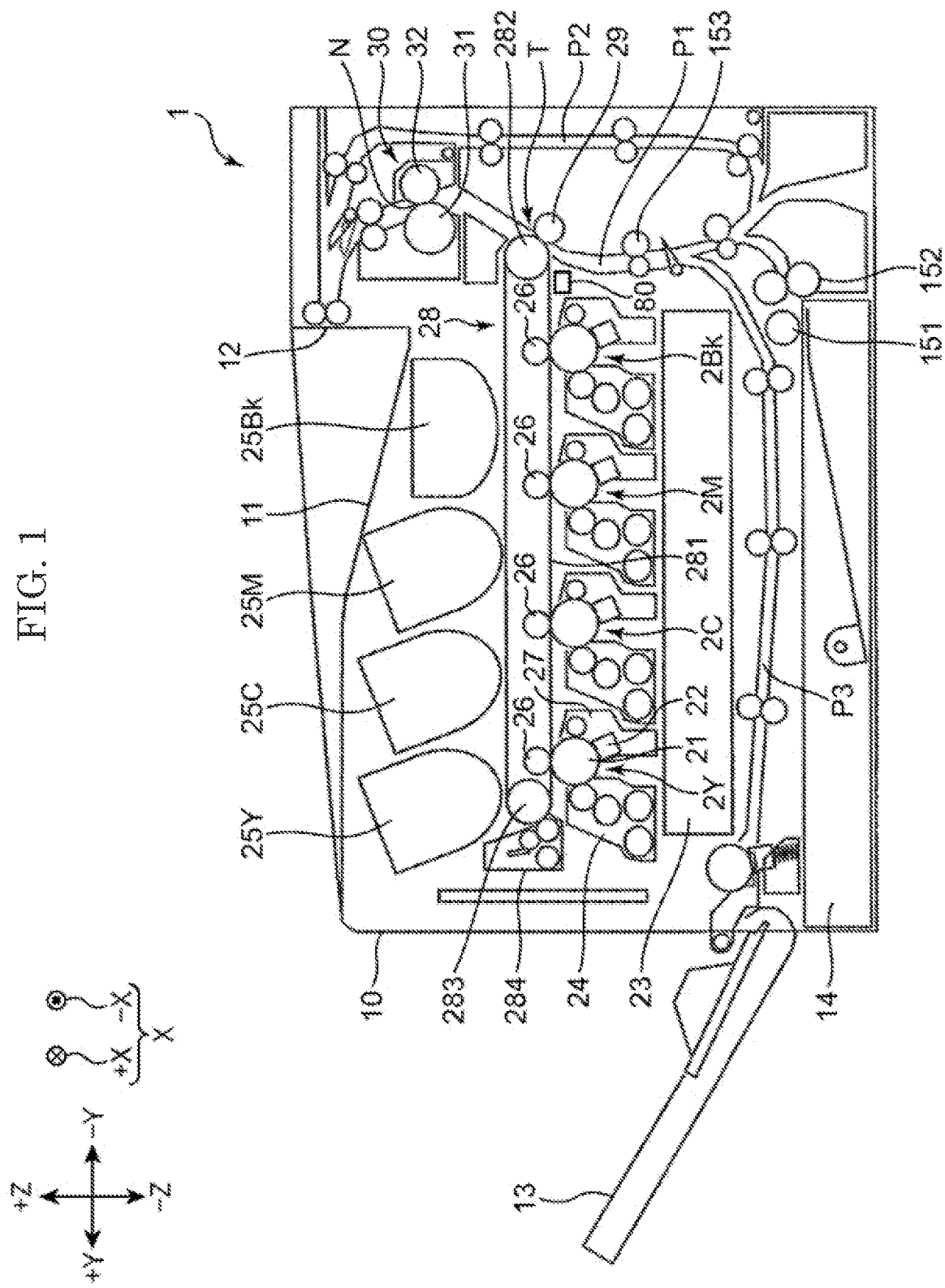
FIG. 1 is a view schematically showing an image forming apparatus including an optical scanning device according to one embodiment of the present disclosure.

[Entire Structure of Image Forming Apparatus] FIG. 1 is a view schematically showing an image forming apparatus 1 including an optical scanning device 23 according to one embodiment of the present disclosure. The image forming apparatus 1 is a tandem-type color printer, and includes a main body housing 10 having a substantially rectangular parallelepiped shape. The image forming apparatus 1 may be a full-color copying machine or a multifunction peripheral.

The main body housing 10 stores various processing units for performing an image forming processing on a sheet. In this embodiment, the processing units include image forming units 2Y, 2C, 2M, and 2Bk, the optical scanning device 23, an intermediate transferring unit 28, and a fixing unit 30.

A sheet discharge tray 11 is provided on the upper surface of the main body housing 10. A sheet discharge port 12 is opened so as to face the sheet discharge tray 11. On the side wall of the main body housing 10, a manual sheet feeding tray 13 is rotatably mounted. In a lower portion of the inside of the main body housing 10, a sheet feeding cassette 14 in which the sheet to be subjected to the image forming processing is stored is detachably attached. The sheet stored in the sheet feeding cassette 14 contains a plain paper (a copy paper), a coated paper, an OHP sheet, a thick paper, a postcard, a tracing paper, other sheet materials subjected to the image forming processing, or sheet materials subjected to any processing other than the image forming processing.

The image forming units 2Y, 2C, 2M and 2Bk form toner images of yellow (Y), cyan (C), magenta (M) and black (Bk) based on image data transmitted from an external device such as a computer. The image forming units 2Y, 2C, 2M and 2Bk are disposed in tandem at predetermined intervals in the Y direction (the front-and-rear direction). Each of the image forming units 2Y, 2C, 2M, and 2Bk includes a photosensitive drum 21 (an image carrier), a charger 22, and a development device 24. The photosensitive drum 21 is formed by a cylindrical body extending in the X direction (the left-and-right direction), and carries an electrostatic latent image and a toner image on its circumferential surface. The charger 22 charges the circumferential surface of the photosensitive drum 21. The development device 24 forms a toner image by supplying the toner to the electrostatic latent image carried on the circumferential surface of the photosensitive drum 21. The image forming units 2Y, 2C, 2M and 2Bk respectively include toner containers 25Y, 25C, 25M and 25Bk of yellow, cyan, magenta and black for replenishing the toner of each color to the corresponding development devices 24.

Each of the image forming units 2Y, 2C, 2M and 2Bk includes a primary transferring roller 26 which primarily transfers the toner image formed on the photosensitive drum 21, and a cleaning device 27 which removes the residual toner on the circumferential surface of the photosensitive drum 21.

In the following description, the image forming units 2Y, 2C, 2M and 2Bk have the same configuration, and are sometimes collectively called the image forming unit 2. Sometimes, the photosensitive drum provided in the image forming unit 2Y may be called "a first photosensitive drum 21Y", the photosensitive drum provided in the image forming unit 2C may be called "a second photosensitive drum 21C", the photosensitive drum provided in the image forming unit 2M may be called "a third photosensitive drum 21M", and the photosensitive drum provided in the image forming unit 2Bk may be called "a fourth photosensitive drum 21Bk".

The optical scanning device 23 is included in the image forming apparatus 1, and forms the electrostatic latent image on the circumferential surface of the photosensitive drum 21 of each color. The optical scanning device 23 includes an incident optical system including a plurality of light sources prepared for each color, an optical deflection unit which deflects light beams emitted from the light sources, and an image forming optical system which forms an image on the circumferential surface of the photosensitive drum 21 of each color by the light beams deflected by the optical deflection unit and scans the circumferential surface. The optical scanning device 23 will be described later in detail.

The intermediate transferring unit 28 primarily transfers the toner image formed on the circumferential surface of the photosensitive drum 21 to an intermediate transferring belt 281. Specifically, the intermediate transferring unit 28 includes the intermediate transferring belt 281 traveling while coming into contact with the circumferential surface of each photosensitive drum 21, a drive roller 282 and a driven roller 283 around which the intermediate transferring belt 281 is wound. The intermediate transferring belt 281 is an endless belt having a width in the X direction (the left-and-right direction) and extending in the Y direction (the front-and-rear direction), and is pressed against the circumferential surface of each photosensitive drum 21 by the primary transferring rollers 26. The toner image on the circumferential surface of the photosensitive drum 21 of each color is overlapped on the intermediate transferring belt 281 and is primarily transferred to the intermediate transferring belt 281. Thus, a full-color toner image is formed on the intermediate transferring belt 281.

A secondary transferring roller 29 is disposed so as to face the drive roller 282 to form a secondary transferring nip area T between the secondary transferring roller 29 and the intermediate transferring belt 281. The full-color toner image on the intermediate transferring belt 281 is secondarily transferred to the sheet at the secondary transferring nip area T. The toner remaining on the circumferential surface of the intermediate transferring belt 281 without being transferred to the sheet is collected by a belt cleaning device 284 disposed opposite to the driven roller 283.

The fixing unit 30 includes a fixing roller 31 in which a heat source is stored, and a pressure roller 32 forming a fixing nip area N together with the fixing roller 31. The fixing unit 30 heats and presses the sheet on which the toner image is transferred at the secondary transferring nip area T, and fixes the toner image to the sheet at the fixing nip area N. The sheet on which the toner image is fixed is discharged through the sheet discharge port 12 toward the sheet discharge tray 11.

Inside the main body housing 10, a sheet conveyance path for conveying the sheet is provided. The sheet conveyance path includes a main conveyance path P1 extending in the Z direction (the upper-and-lower direction) from near the lower portion to near the upper portion of the inside of the main body housing 10 through the secondary transferring nip area T and the fixing unit 30. The downstream end of the main conveyance path P1 is connected to the sheet discharge port 12. An inversion conveyance path P2 for inverting and conveying the sheet when performing a both-side printing is extended from the most downstream end of the main conveyance path P1 to near the upstream end. A manual sheet conveyance path P3 extending from the manual sheet feeding tray 13 to the main conveyance path P1 is disposed above the sheet feeding cassette 14.

The sheet feeding cassette 14 includes a sheet storage part in which a bundle of the sheets is stored. The sheet feeding cassette 14 includes a pickup roller 151 which feeds the uppermost sheet of the sheet bundle one by one, and a sheet feeding rollers pair 152 which feeds the sheet to the upstream end of the main conveyance path P1. The sheet placed on the manual sheet feeding tray 13 is also fed to the upstream end of the main conveyance path P1 through the manual sheet conveyance path P3. On the upstream side of the secondary transferring nip area T on the main conveyance path P1, a pair of registration rollers 153 which feed the sheet to the secondary transferring nip area T at a predetermined timing is disposed.

When the image forming processing for forming the image on one side of the sheet is performed, the sheet is fed from the sheet feeding cassette 14 or the manual sheet feeding tray 13 to the main conveyance path P1. Then, the toner image is transferred to the sheet at the secondary transfer nip area T, and the toner image is fixed to the sheet at the fixing unit 30. Thereafter, the sheet is discharged through the sheet discharge port 12 to the sheet discharge tray 11. On the other hand, when the image forming processing for forming images on both sides of the sheet is performed, after the toner image is transferred and fixed to one side of the sheet, a part of the sheet is discharged through the sheet discharge port 12 on the sheet discharge tray 11. Thereafter, the sheet is conveyed in a switchback manner and returned to near the upstream end of the main conveyance path P1 through the inversion conveyance path P2. Thereafter, the toner image is transferred and fixed to the back surface of the sheet, and the sheet is discharged through the sheet discharge port 12 to the sheet discharge tray 11.

Figure 2:
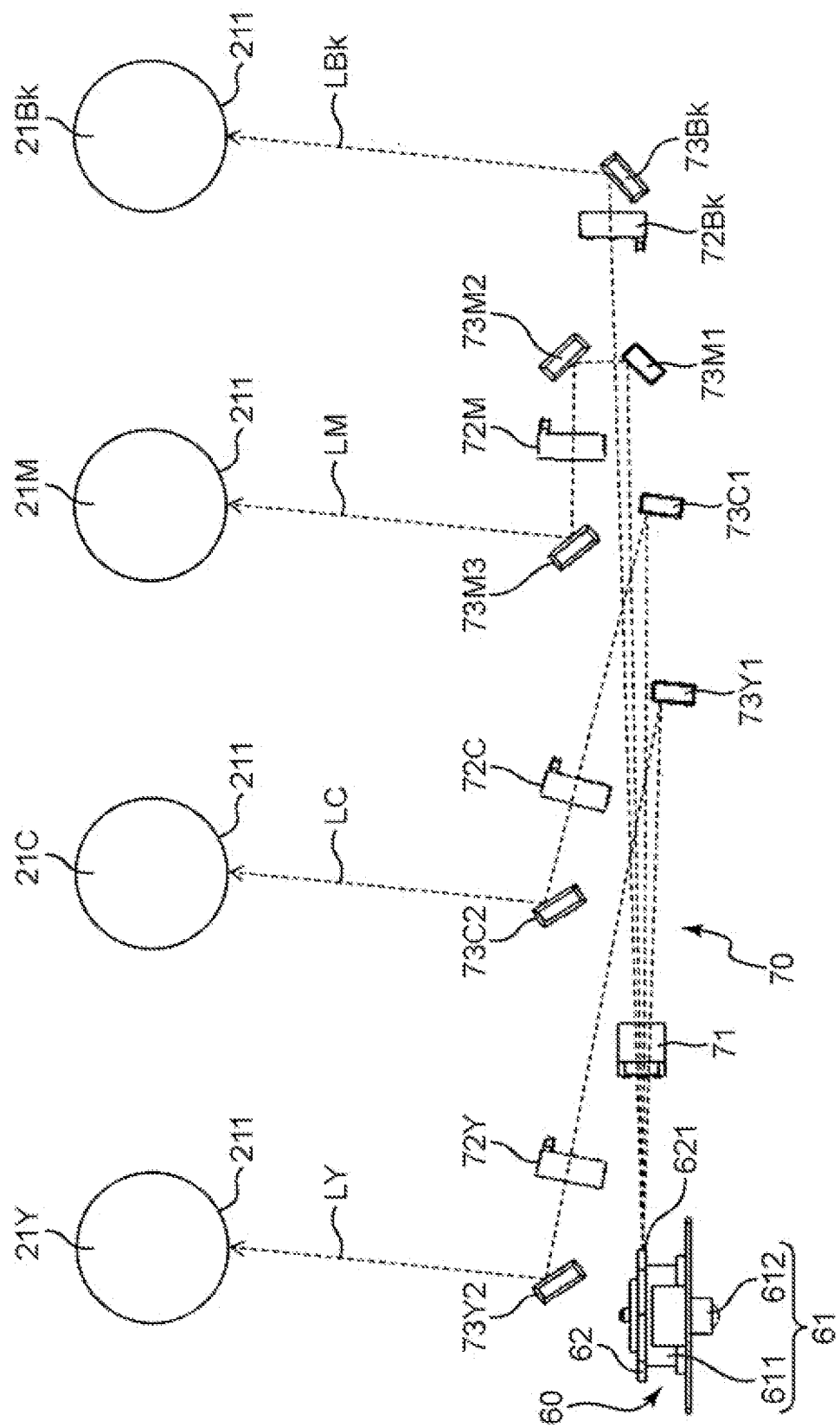
FIG. 2 is a view showing an optical path of the optical scanning device, on a section in a sub-scanning direction.
Figure 3:
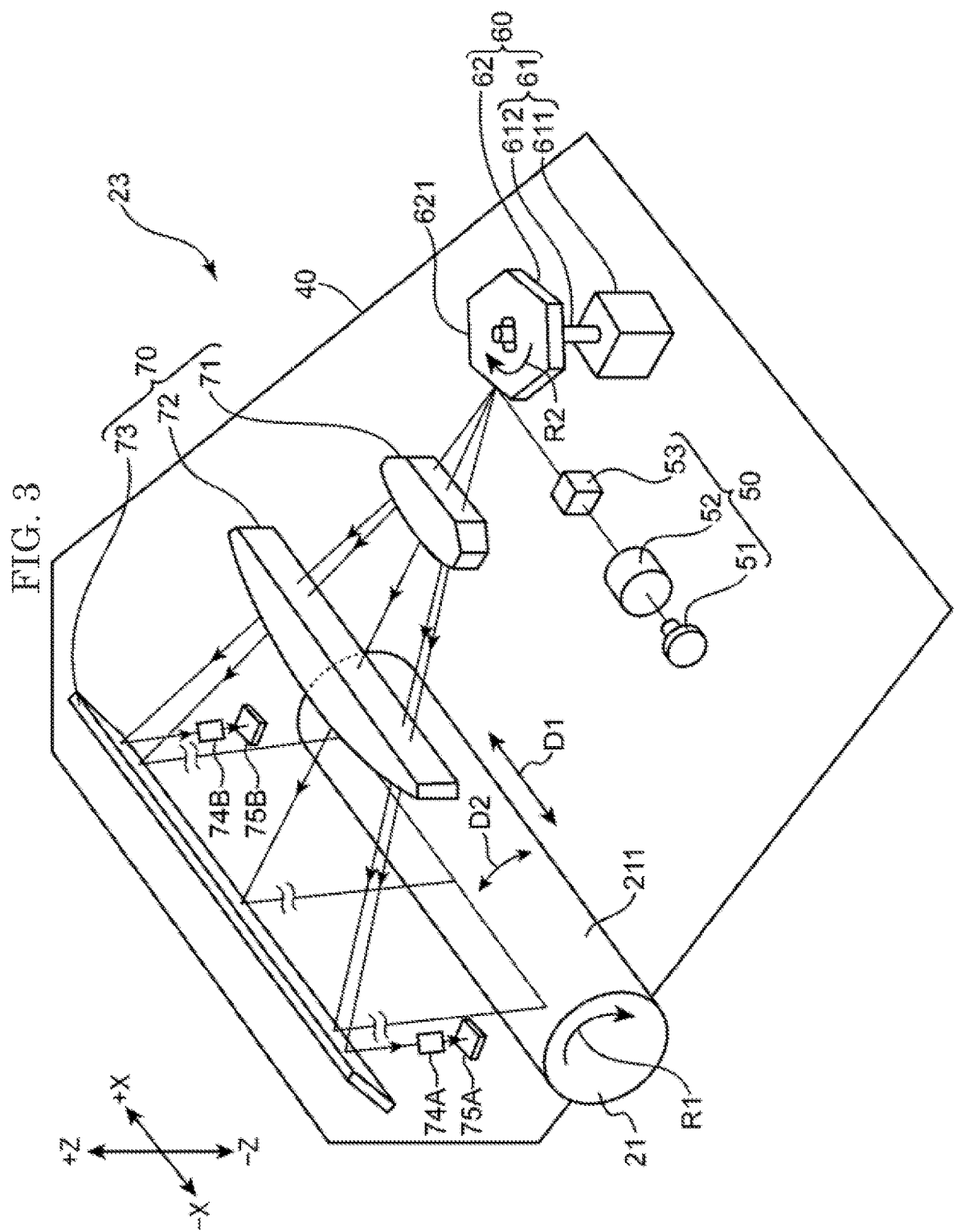
FIG. 3 is a perspective view schematically showing an inner structure of the optical scanning device.
Figure 4:
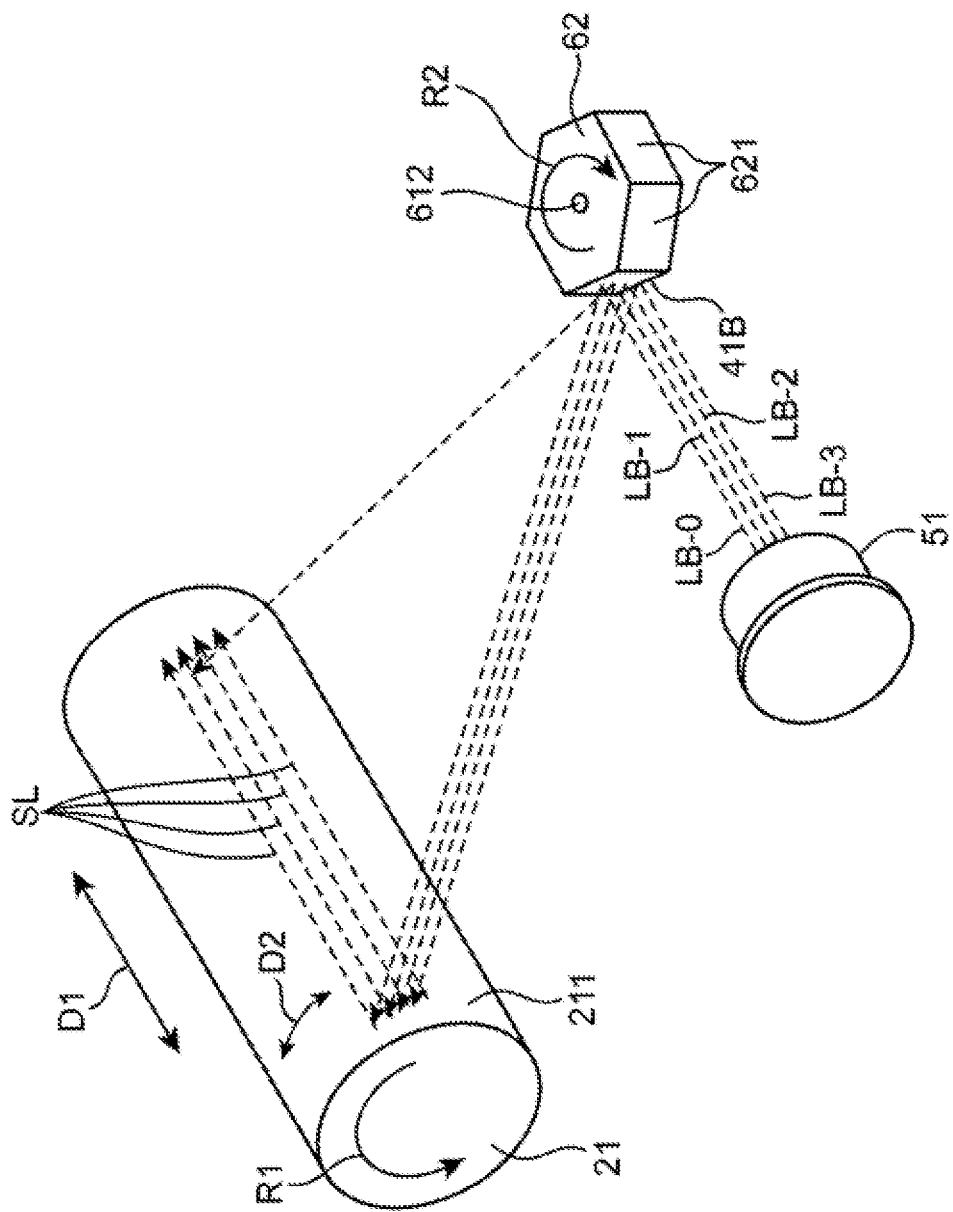
FIG. 4 is a perspective view schematically showing an exposure state for a photosensitive drum by the optical scanning device.
Figure 5:
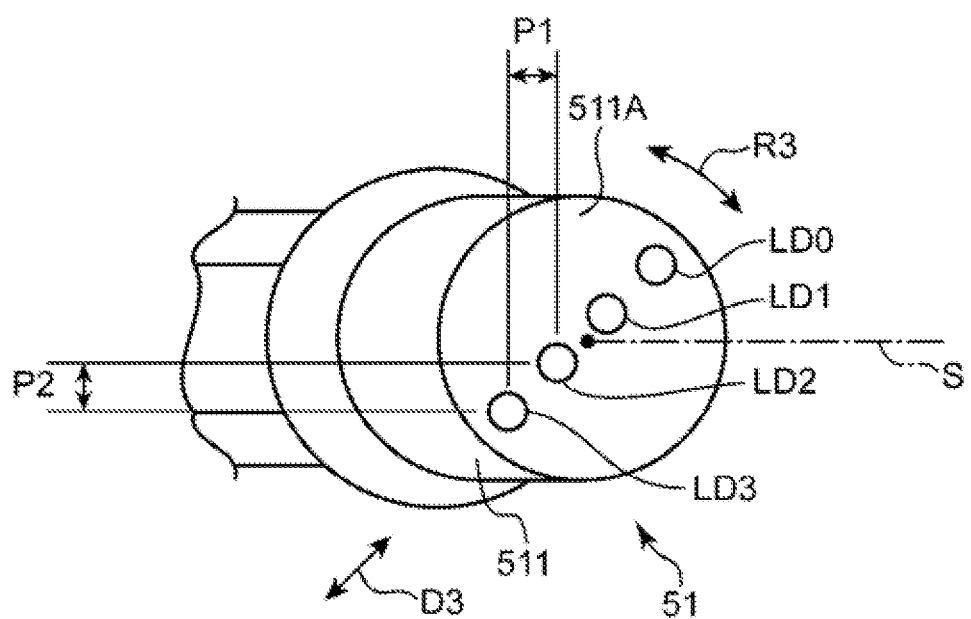
FIG. 5 is a perspective view showing a light source provided in the optical scanning device.

[Configuration of Optical Scanning Device] Next, the configuration of the optical scanning device 23 will be described in detail. FIG. 2 is a view showing an optical path of the optical scanning device 23, on a section in a sub-scanning direction. FIG. 3 is a perspective view schematically showing the internal structure of the optical scanning device 23. FIG. 4 is a perspective view schematically showing an exposure state for the photosensitive drum 21 by the optical scanning device 23. FIG. 5 is a perspective view showing a light source 51 provided in the optical scanning device 23.

As shown in FIG. 2, the optical scanning device 23 scans the circumferential surface 211 of the first photosensitive drum 21Y for yellow in the main scanning direction D1 with a yellow light beam LY, which is a laser light beam for drawing a yellow image, and forms the electrostatic latent image on the circumferential surface 211. In the same manner, the optical scanning device 23 scans the circumferential surfaces 211 of the second photosensitive drum 21C for cyan, the third photosensitive drum 21M for magenta, and the fourth photosensitive drum 21 Bk for black in the main scanning direction D1 with a cyan light beam LC which is a laser beam for drawing a cyan image, a magenta light beam LM which is a laser beam for drawing a magenta image, and a black light beam LBk which is a laser beam for drawing a black image, respectively, and forms the electrostatic latent images on the circumferential surfaces 211. The main scanning direction D1 in which the optical scanning device 23 scans the photosensitive drum 21 is a direction that coincides with the X direction (the left-and-right direction), which is an axial direction of the photosensitive drum 2.

As shown in FIG. 3, the optical scanning device 23 includes an incident optical system 50 disposed on the optical path of the light beam of each color, a light deflection unit 60 commonly used for the four colors, an image forming optical system 70, and an optical housing 40 in which they are stored.

The incident optical system 50 is stored in the optical housing 40, and is an optical system configured to make the light beam of each color be incident on a deflection surface 621 of a polygon mirror 62 (a deflector) constituting the light deflection unit 60 described later. The incident optical system 50 includes a light source 51, a collimator lens 52, and a cylindrical lens 53.

As shown in FIG. 4, the light source 51 is a multi-beam type light source that emits a plurality of light beams LB-0 to LB-3 for irradiating the deflection surfaces 621 of the polygon mirror 62. Specifically, as shown in FIG. 5, the light source 51 is a monolithic multi-laser diode having four light emitting parts LD0 to LD3 formed of laser diodes (LD) emitting the light beam to a tip surface 511A of a cylindrical plug member 511. The four light emitting parts LD0 to LD3 are arranged in a predetermined arrangement direction D3 (a predetermined direction) at a main scanning pitch P1 in the main scanning direction D1 and at a sub-scanning pitch P2 (a predetermined interval) in a sub-scanning direction D2 perpendicular to the main scanning direction D1. In the light source 51, the light emitting part LD0, the light emitting part LD1, the light emitting part LD2, and the light emitting part LD3 are arranged in the order from the upstream to the downstream in the sub-scanning direction D2. The light source 51 is not limited to this, and may be a monolithic multi-laser diode in which two or more light emitting parts are arranged on the same chip.

As shown in FIG. 3, the collimator lens 52 is a lens for converting the diffused light beam emitted from each of the light emitting parts LD0 to LD3 of the light source 51 into a parallel light. The cylindrical lens 53 is a lens which converts the parallel light by the collimator lens 52 into a linear light long in the main scanning direction D1 and focuses the linear light on the deflection surface 621 of the polygon mirror 62.

As shown in FIG. 2 to FIG. 4, the light deflection unit 60 is stored in the optical housing 40, reflects the light beam focused by the collimator lens 52 and deflects it to scan the circumferential surface 211 of the photosensitive drum 21 in the main scanning direction D1. The light deflection unit 60 includes a polygon motor 61 and the polygon mirror 62.

The polygon motor 61 includes a motor main body 611 and a rotational shaft 612. In the polygon motor 61, the rotational shaft 612 is protruded from the motor main body 611 and extends in the Z direction (the upper-and-lower direction). The polygon motor 61 is configured such that the rotational shaft 612 is rotated around an axis when a drive current is input to the motor main body 611.

The polygon mirror 62 is formed into a hexagonal prism rotating around the axis, and has the deflection surfaces 621 for reflecting the light beam on the six side surfaces. That is, the polygon mirror 62 has the first to the sixth deflection surfaces 621 in the order from the upstream side to the downstream side in the rotational direction. In the polygon mirror 62, the first deflection surface 621 is disposed on the most upstream side in the rotational direction, and the second deflection surface 621 is adjacently disposed on the downstream side of the first deflection surface 621 in the rotational direction. In the same manner, the third to the sixth deflection surfaces 621 are disposed sequentially on the downstream side of the second deflection surface 621 in the rotational direction. On each deflection surface 621, each of the light beams LB-0 to LB-3 emitted from the light emitting parts LD0 to LD3 of the light source 51 and passed through the collimator lens 52 and the cylindrical lens 53 is irradiated. The polygon mirror 62 is formed integrally with the rotational shaft 612, reflects each of the light beams LB-0 to LB-3 irradiated on the reflection surfaces 621 while rotating in the direction shown by the arrow R2 around the rotational shaft 612 with the rotation of the rotational shaft 612, and performs the deflection scanning. That is, it becomes possible to scan the circumferential surface 211 of the photosensitive drum 21 in the main scanning direction D1 with the light beams LB-0 to LB-3 deflected and scanned by the polygon mirror 62.

As shown in FIG. 3, the image forming optical system 70 is stored in the optical housing 40, focuses the light beams LB-0 to LB-3 deflected and scanned by the polygon mirror 62 on the circumferential surface 211 of the photosensitive drum 21 and scans the circumferential surface 211 of the photosensitive drum 21 with the light beams LB-0 to LB-3.

As shown in FIG. 2, the image forming optical system 70 includes a first scanning lens 71, and second scanning lenses 72Y, 72C, 72M and 72Bk. Further, the image forming optical system 70 includes yellow reflection mirrors 73Y1 and 73Y2 for reflecting the yellow light beam LY, cyan reflection mirrors 73C1 and 73C2 for reflecting the cyan light beam LC, magenta reflection mirrors 73M1, 73M2 and 73M3 for reflecting the magenta light beam LM, and a black reflection mirror 73Bk for reflecting the black light beam LBk.

The first scanning lens 71 is a lens having a distortion aberration (a fθ characteristic) in which an angle of the incident light beam is proportional to an image height, and is a long lens extending along the main scanning direction D1. The first scanning lens 71 is arranged in the optical housing 40 so as to face the deflection surface 621 of the polygon mirror 62. The first scanning lens 71 condenses the light beams LB-0 to LB-3 reflected on the deflection surfaces 621 of the polygon mirror 62.

Each of the second scanning lenses 72Y, 72C, 72M and 72Bk is a long lens having a distortion aberration (a fθ characteristic) similarly to the first scanning lens 71 and extending along the main scanning direction D1. The second scanning lens 72Y condenses the yellow light beam LY passed through the first scanning lens 71 and focuses it on the circumferential surface 211 of the first photosensitive drum 21Y. In the same manner, the second scanning lenses 72C, 72M, and 72Bk condense the cyan light beam LC, the magenta light beam LM, and the black light beam LBk passed through the first scanning lens 71, and focuses them on the circumferential surfaces 211 of the second photosensitive drum 21C, the third photosensitive drum 21M, and the fourth photosensitive drum 21Bk, respectively. The second scanning lenses 72Y, 72C, 72M, and 72Bk have the same configuration, and they may be collectively called the second scanning lens 72 in the following description. FIG. 3 shows the second scanning lens 72.

The yellow reflection mirrors 73Y1 and 73Y2 reflect the yellow light beam LY on the image forming optical path of the yellow light beam LY passed through the first scanning lens 71. The cyan reflection mirrors 73C1 and 73C2 reflect the cyan light beam LC on the image forming optical path of the cyan light beam LC passed through the first scanning lens 71. The magenta reflection mirrors 73M1, 73M2, 73M3 reflect the magenta light beam LM on the image forming optical path of the magenta light beam LM passed through the first scanning lens 71. The black reflection mirror 73Bk reflects the black light beam LBk on the image forming optical path of the black light beam LBk passed through the first scanning lens 71. The yellow reflection mirrors 73Y1 and 73Y2, the cyan reflection mirrors 73C1 and 73C2, the magenta reflection mirrors 73M1, 73M2 and 73M3, and the black reflection mirror 73Bk have the same configuration, and they may be collectively called the reflection mirror 73 in the following description. FIG. 3 shows the reflection mirror 73.

As shown in FIG. 2, the yellow light beam LY reflected by the deflection surface 621 of the polygon mirror 62 is condensed by the first scanning lens 71, is reflected by the yellow reflection mirror 73Y1, passes through the second scanning lens 72Y, is reflected by the yellow reflection mirror 73Y2, and then is focused on the circumferential surface 211 of the first photosensitive drum 21Y. The cyan light beam LC reflected by the deflection surface 621 of the polygon mirror 62 is condensed by the first scanning lens 71, is reflected by the cyan reflection mirror 73C1, passes through the second scanning lens 72C, is reflected by the cyan reflection mirror 73C2, and is focused on the circumferential surface 211 of the second photosensitive drum 21C. The magenta light beam LM reflected by the deflection surface 621 of the polygon mirror 62 is condensed by the first scanning lens 71, is reflected by the magenta reflection mirrors 73M1 and 73M2, passes through the second scanning lens 72M, is reflected by the magenta reflection mirror 73M3, and is focused on the circumferential surface 211 of the third photosensitive drum 21M. The black light beam LBk reflected by the deflection surface 621 of the polygon mirror 62 is condensed by the first scanning lens 71 and the second scanning lens 72 Bk, is reflected by the black reflection mirror 73Bk, and is focused on the circumferential surface 211 of the fourth photosensitive drum 21Bk.

As shown in FIG. 3, the optical scanning device 23 includes a first condense lens 74A, a second condense lens 74B, a first BD (beam detect) senser 75A, and a second BD senser 75B. The first condense lens 74A and the second condense lens 74B are disposed on the optical path out of an effective scanning region on the circumferential surface 211 of the photosensitive drum 21 by the polygon mirror 62. The first condense lens 74A and the second condense lens 74B are each a lens which focuses each of the light beams LB-0 to LB-3 reflected by the deflection surfaces 621 of the polygon mirror 62 on the first BD senser 75A and the second BD senser 75B, respectively.

The first BD senser 75A and the second BD senser 75B detect the emitting of the light beams LB-0 to LB-3 at a predetermined position out of the region where the electrostatic latent image is formed on the circumferential surface 211 in order to determine a timing when each of the light beams LB-0 to LB-3 scans a position corresponding to each pixel of the electrostatic latent image on the circumferential surface 211 in the main scanning direction D1. Specifically, the first BD senser 75A is disposed on a scanning start side from a main scanning line SL (see FIG. 4) formed by scanning on the circumferential surface 211 in the main scanning direction D1 with each of the light beams LB-0 to LB-3 emitted from the light emitting parts LD0 to LD3. The second BD senser 75B is disposed on a scanning end side from the main scanning line SL. For example, each of the first BD senser 75A and the second BD senser 75B is formed by a photodiode or the like, outputs a high level signal while it does not detect the emitting of the light beam, and outputs a low level signal while the light beam is being passed through the light reception surface.

An interval between the four main scanning lines SL in the sub-scanning direction D2 can be adjusted by rotating the light source 51. Specifically, as shown in FIG. 5, by rotating the light source 51 in the direction shown by the arrow R3 around a normal line S passing through the center, among the normal lines to the tip end surface 511A of the plug member 511, as a rotational axis, the sub-scanning pitch PD2 of the four light emitting parts LD0 to LD3 can be changed apparently. For example, by rotating the light source 51 in the clockwise direction around the normal line S, the interval between the four main scanning lines SL in the sub-scanning direction D2 can be decreased. On the other hand, by rotating the light source 51 in the counterclockwise direction, the interval between the four main scanning lines SL in the sub-scanning direction D2 can be increased. In other word, by rotating the light source 51, a pitch of the light beam corresponding to the density (the resolution) of the pixel of the electrostatic latent image to be formed on the circumferential surface 211 in the sub-scanning direction D2 can be obtained.

Figure 6:
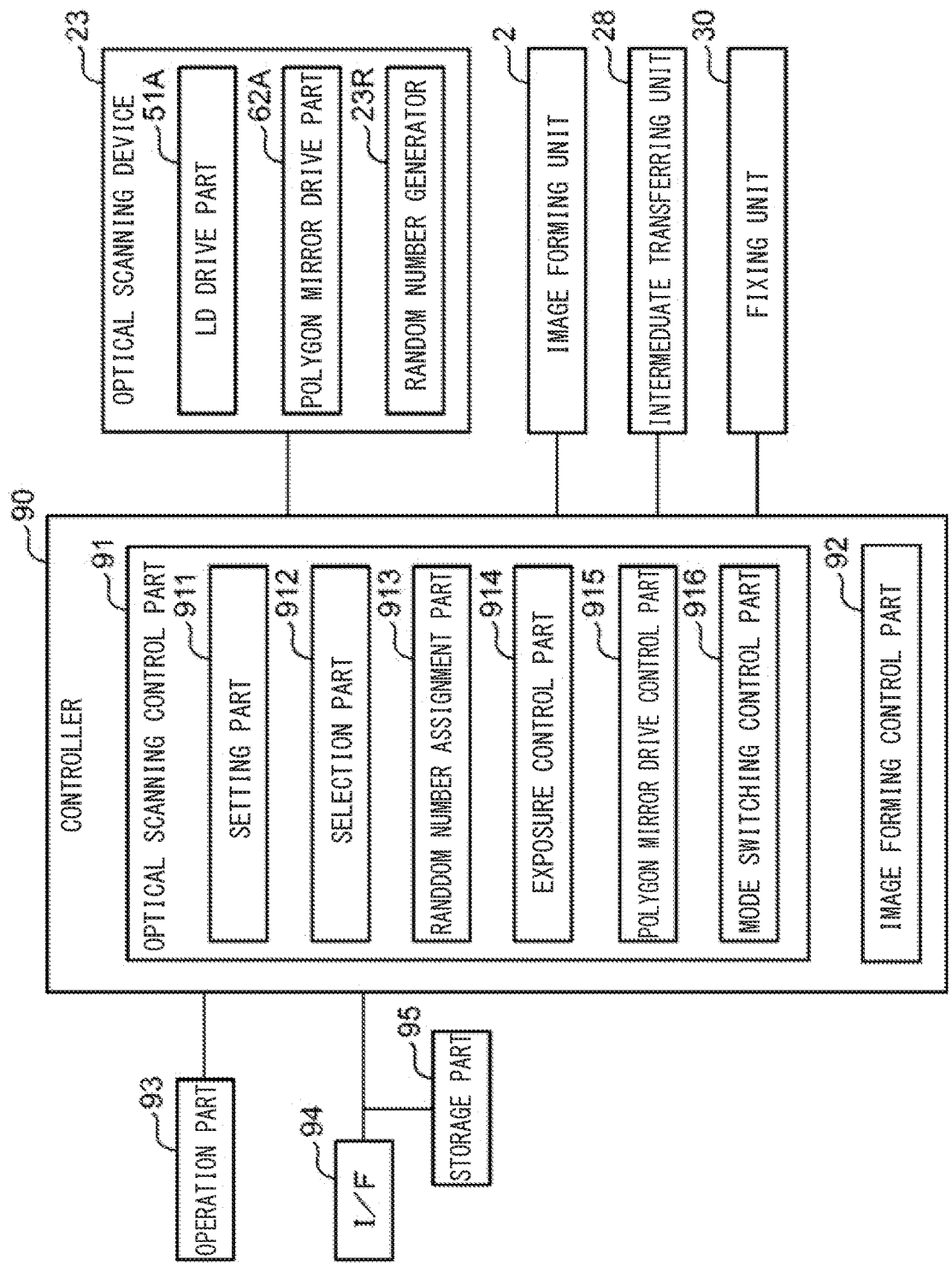
FIG. 6 is a block diagram showing an electrical configuration of the image forming apparatus.

[Electrical Configuration of Image Forming Apparatus]
Next, with reference to the block diagram shown in FIG. 6, an electric configuration of the image forming apparatus 1 will be described. The image forming apparatus 1 includes a controller 90, an operation part 93, an I/F (an interface) 94 and a storage part 95.

The controller 90 includes a CPU (a central processing unit), a ROM (a read only memory) which stores control program, a RAM (a random access memory) which is used as a working area of the CPU, and the others. The controller 90 executes processing based on the control program stored in the ROM to control each unit of the image forming apparatus 1.

The operation part 93 includes a touch panel, a ten key, a start key, a setting key and the others, and receives various operation by a user. For example, the operation part 93 receives a condition of the image forming processing, an instruction for performing the image forming processing based on the condition, and the others, input by the user.

The I/F 94 is an interface circuit for achieving a data communication with an external device. For example, the I/F 94 generates a communication signal according to a communication protocol of a network connecting the image forming apparatus 1 to the external device, and inverts the communication signal input from the network side into a data of a type which is capable of being processed by the image forming apparatus 1. For example, when the I/F 94 receives a printing instruction signal containing image data showing the target image to be formed on the sheet and a condition for forming the image on the sheet, it outputs the received printing instruction signal to the controller 90. In this case, the controller 90 performs the image forming processing in which the image shown by the received image data is formed on the sheet based on the received condition.

The storage part 95 is constructed by a storage device such as an HDD (a hard disk drive), for example, and stores various data under control of the controller 90. For example, the storage part 95 stores the image data or the like input from the I/F 94 to the controller 90. The storage part 95 previously stores various parameter used for the control by the controller 90. For example, the storage part 95 stores rotational speeds of the photosensitive drum 21 and the intermediate transferring belt 281, a conveyance speed of the sheet, and the others.

The optical scanning device 23 further includes a LD drive part 51A, a polygon mirror drive part 62A and a random number generator 23R. The LD drive part 51A is a driver which drives the light emitting parts LD0 to LD3 of the light source 51. The polygon mirror drive part 62A controls the rotation of the polygon mirror 62 by the polygon motor 61.

Figure 7:
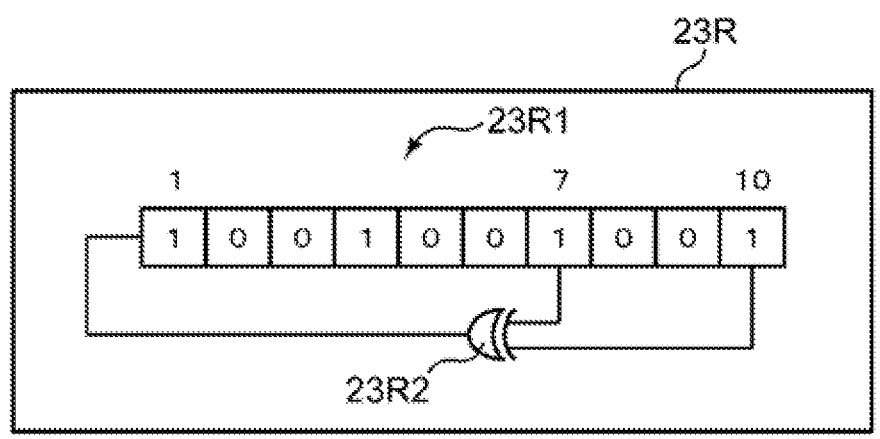
FIG. 7 is a view schematically showing a random number generator provided in the optical scanning device.

The random number generator 23R sequentially generates a plurality of pseudo random number sequences with an initial random number sequence having a predetermined bit length as a seed, in which the pseudo random number sequence has the same bit length as the initial random number sequence. FIG. 7 is a view schematically showing the random number generator 23R. The random number generator 23R includes a linear feedback shift register (LFSR) 23R1 and an exclusive OR (XOR) arithmetic part 23R2, for example. The LFSR 23R1 is a M-sequence pseudo random number generation circuit. FIG. 7 shows the LFSR 23R1 of a 10 bits length, but the LFSR 23R1 is not limited thereto.

To the LFSR 23R1, the initial random number sequence in which all bits are not "0" is given as a seed. In the example shown in FIG. 7, the initial random number sequence having a 10 bits length is given to the LFSR 23R1 as a seed. The LFSR 23R1 is configured such that a value on a tap position on a bit stream corresponding to a feedback polynomial according to a bit length is input to the XOR arithmetic part 23R2. The output of the XOR arithmetic part 23R2 is input to the first bit of the bit stream. In the LFSR 23R1, all possible states other than the state in which all bits are "0" appear in a period. The random number period indicating the period is shown by "$2^n-1$" using the number of bit n. As in the example shown in FIG. 7, when the bit stream having a 10 bits length in which a number of bit is "10" is used, the random number period is shown by "$2^{10}-1=1023$".

As shown in FIG. 7, when the bit stream having a 10 bits length is used, the feedback polynomial M(X) is expressed by the following expression (1).

$$M(X)=X^{10}+X^7+1 \tag{1}$$

In this case, of the 10 bits of the initial random number sequence, the seventh bit and the tenth bit serve as the tap position. Then, the values of the seventh bit and the tenth bit are input to the XOR arithmetic part 23R2. The XOR arithmetic part 23R2 calculates an exclusive OR of the values of the seventh bit and the tenth bit, feeds back the calculated result and then inputs it to the first bit. In the LFSR 23R1, when the exclusive OR is input to the first bit, the value at the preceding bit position is shifted and input to the second bit and the following bits. The random number generator 23R sequentially generates a plurality of pseudo-random number sequences of a 10 bits length with the initial random number sequence of a 10 bits length as a seed by repeating one cycle in which the shifted value is input to the second bit to the tenth bit based on the input of exclusive OR to the first bit.

The random number generator 23R includes the LFSR 23R1 so that it becomes possible to easily obtain the pseudo random number sequence by a small circuit. The initial random number sequence used as a seed in the random number generator 23R and the plurality of pseudo random number sequences sequentially generated by the random number generator 23R are input to an optical scanning control part 91, described later, in the controller 90.

The controller 90 executes the control program stored in the ROM to control each unit of the image forming apparatus 1 and performs the image forming processing. In the present embodiment, the controller 90 functions as an image forming control part 92 and the optical scanning control part 91 (a part of the optical scanning device 23).

The image forming control part 92 mainly controls the operation of the image forming unit 2, the intermediate transferring unit 28 and the fixing unit 30 to perform the image forming processing. Specifically, the image forming control part 92 rotates the photosensitive drum 21 around the axis at a rotational speed set by a setting part 911 described later. The image forming control part 92 switches the charger 22 into an ON state and into an OFF state at a timing according to the rotational speed of the photosensitive drum 21. The image forming control part 92 causes the optical scanning control part 91 to control the scanning operation of the light beam by the optical scanning device 23 and causes the development device 24 to be applied with the development bias at a timing according to the rotational speed of the photosensitive drum 21. The image forming control part 92 causes the primary transferring roller 26 and the secondary transferring roller 29 to be applied with the transferring biases at a timing according to the rotational speed of the photosensitive drum 21. The image forming control part 92 rotates the intermediate transferring belt 281 in the intermediate transferring unit 28 and rotates the pressing roller 31 in the fixing unit 30 at the rotational speed according to the rotational speed of the photosensitive drum 21.

The optical scanning control part 91 constitutes a part of the optical scanning device 23, and controls the scanning operation of the light beam in the optical scanning device 23. The optical scanning control part 91 includes the setting part 911, a selection part 912, a random number assignment part 913, an exposure control part 914, a polygon mirror drive control part 915 and a mode switching control part 916 as a functional composition.

The setting part 911 sets the rotational speeds of the photosensitive drum 21 and the polygon mirror 62 according to the condition of the image forming processing contained in the printing instruction signal, such as a density of an image to be formed on the sheet in the image forming processing, a type of the sheet and the others. For example, it is assumed that, as the condition of the image forming processing, a density (resolution) (for example, 600 dpi) of the pixel of the image in the sub-scanning direction D2 is set to be lower than a density (for example, 1200 dpi) of the light emitting parts LD0 to LD3 of the light source 51 in the sub-scanning direction D2, and each pixel of the electrostatic latent image corresponding to the image is formed by the scanning of a plurality of the light beams. In this case, the setting part 911 sets the rotational speeds of the photosensitive drum 21 and the polygon mirror 62 such that when the plurality of light beams capable of being emitted from the light source 51 is emitted to each of two adjacent deflection surfaces 621 of the polygon mirror 62, one or more positions on the circumferential surface 211 in the sub-scanning direction D2 are scanned with the two light beams different from each other.

The selection part 912 selects one or more light emitting parts (hereinafter, called "a target emitting part") emitting one or more light beams used for forming each pixel of the electrostatic latent image, among the four light emitting parts LD0 to LD3 provided in the light source 51. When each pixel of the electrostatic latent image is formed by the scanning of the plurality of light beams, the selection part 912 executes a selection processing in which the two light emitting part arranged adjacently to each other in the arrangement direction D3 and capable of emitting the light beams at the same time to one deflection surface 621 of the first to the sixth deflection surfaces 621 in order to form one pixel of the electrostatic latent image to be formed on the circumferential surface 211 by the two light beams are selected as a set of target emitting parts among the four light emitting parts LD0 to LD3. Further, the selection part 912 changes the combination of the light emitting parts constituting the set of target light emitting parts for each position of the pixel of the electrostatic latent image in the sub-scanning direction D2 in the selection processing. The selection processing in the selection part 912 will be described later in detail.

The random number assignment part 913 executes a random number assignment processing in which the initial random number sequence used by the random number generator 23R and a random number sequence selected from the plurality of pseudo random number sequences generated by the random number generator 23R are individually assigned to each light emitting part constituting the set of target light emitting parts for each position of the pixel of the electrostatic latent image in the sub-scanning direction D2. The random number sequence assigned to each light emitting part constituting the set of target light emitting parts serves as an index for specifying a timing at which the light emitting time at the light beam emitting of each light emitting part constituting the set of target light emitting parts is set to a correction value different from a predetermined reference value. That is, each light emitting part constituting the set of target light emitting parts emits the light beam by the light emitting in the light emitting time indicated by the correction value at a timing according to the assigned random number sequence, and emits the light beam by the light emitting in the light emitting time indicated by the reference value at the other timing. The random number assignment part 913 outputs a random number update signal to updates the assignment of the random number sequence to each light emitting part constituting the set of target light emitting parts for each position of each pixel of the electrostatic latent image in the sub-scanning direction D2 at a random number update period specified for each light emitting part constituting the set of target light emitting parts. The random number alignment processing by the random number assignment part 913 will be described later in detail.

The exposure control part 914 outputs a light emitting control signal individually to each light emitting part constituting the set of target light emitting parts for each position of the pixel of the electrostatic latent image in the sub-scanning direction D2, and executes an exposure processing in which the light emitting parts constituting the set of target light emitting parts emit the two light beams. Specifically, the exposure control part 914 outputs the light emitting control signal specified for each light emitting part constituting the set of target light emitting parts to the LD drive part 51A. When receiving the light emitting control signal, the LD drive part 51A causes each light emitting part constituting the set of target light emitting parts to emit the light beam according to the received light emitting control signal. The light emitting control signal is a pulse signal based on the image data. The light emitting control signal is a pulse serving as an index of the timing for causing each light emitting part constituting the set of target light emitting parts to emit the light beam, and contains the pulses different in the pulse width defining the light emitting time of the light emitting part between the width corresponding to the reference value and the width corresponding to the correction value. In the following description, for the pulse contained in the light emitting control signal, the pulse having the pulse width corresponding to the reference value is called "a reference pulse", and the pulse having the pulse width corresponding to the correction value is called "a correction pulse". Each light emitting part constituting the set of target light emitting parts emits the light beam by the light emitting in the light emitting time indicated by the reference value according to the reference pulse contained in the light emitting control signal, and emits the light beam by the light emitting in the light emitting time indicated by the correction value according to the correction pulse contained in the light emitting control signal. Each light emitting part constituting the set of target light emitting parts emits the light beam based on the light emitting control signal at the scanning period specified for each light emitting part constituting the set of light emitting parts. The scanning period shows a period in which each light beam emitted from each light emitting part based on the light emitting control signal scans the circumferential surface 211 of the photosensitive drum 21 in the main scanning direction D1. The exposure processing by the exposure control part 914 will be described later in detail.

The polygon mirror drive control part 915 outputs a rotation control signal for rotating the polygon mirror 62 at the rotational speed set by the setting part 911 to the polygon mirror drive part 62A. When receiving the rotation control signal output by the polygon mirror drive control part 915, the polygon mirror drive part 62A controls the polygon motor 61 so as to rotate the polygon mirror 62 at the rotational speed set by the setting part 911 according to the received rotational control signal.

The mode switching control part 916 executes a control for selecting a first mode in which the rotational speed of the photosensitive drum 21 is set to a first speed V1 and then the image forming processing is performed or a second mode in which the rotational speed of the photosensitive drum 21 is set a second speed V2 slower than the first speed V1 and the image forming processing is performed, and for switching a state of the image forming apparatus 1 to the selected mode.

For example, the mode switching control part 916 selects the first mode and the state of the image forming apparatus 1 is switched into the first mode when it is set that the target sheet to which an image is formed is a plain paper as the condition of the image forming processing. When the state of the image forming apparatus 1 is switched into the first mode, the image forming control part 92 sets the rotational speed of the photosensitive drum 21 to the first speed V1 and performs the image forming processing. On the other hand, the mode switching control part 916 selects the second mode and the state of the image forming apparatus 1 is switched into the second mode when it is set that the target sheet to which an image is formed is a thick paper as the condition of the image forming processing. When the state of the image forming apparatus 1 is switched into the second mode, the image forming control part 92 sets the rotational speed of the photosensitive drum 21 to the second speed V1 and performs the image forming processing. In the above manner, when the target sheet to which an image is formed is a thick paper, the state of the image forming apparatus 1 is switched into the second mode, and the image forming processing is performed in a state where the photosensitive drum 21 rotates at the second speed V2 slower than the first speed V1 which is a rotational speed set for the plain paper. Then, depending on a fact that the rotational speed of the photosensitive drum 21 is changed to the second speed V2 slower than the first speed V1, the intermediate transferring belt 281 and the presser roller 32 are rotated at rotational speeds slower than that in a case where the sheet is a plain paper. As a result, it becomes possible to transfer and fix the toner image to the thick paper surely.

Figure 8:
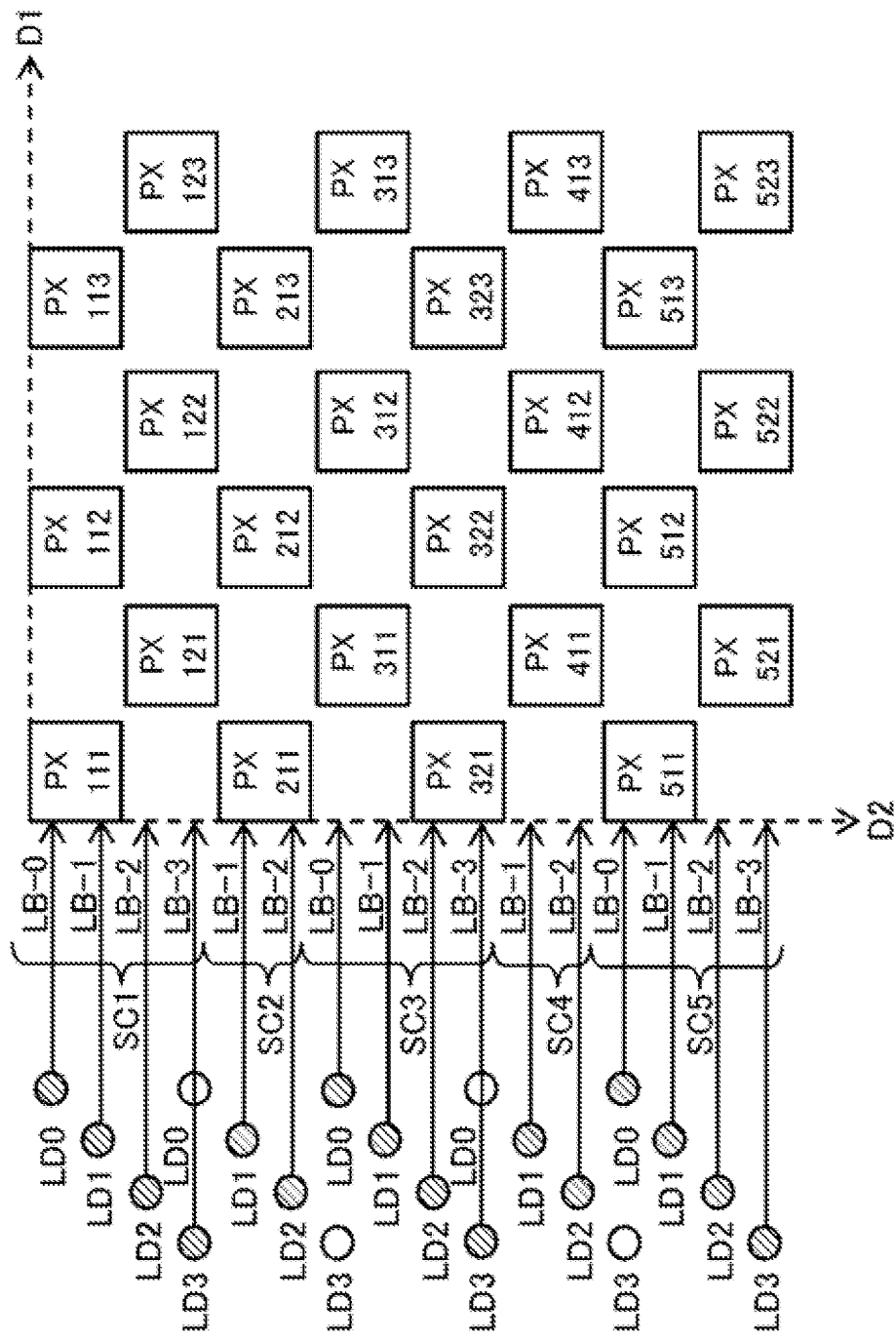
FIG. 8 is a view showing a state where a circumferential surface is scanned in a main scanning direction with a light beam emitted from a target light emitting part when a first selection processing is executed by a selection part.
Figure 9:
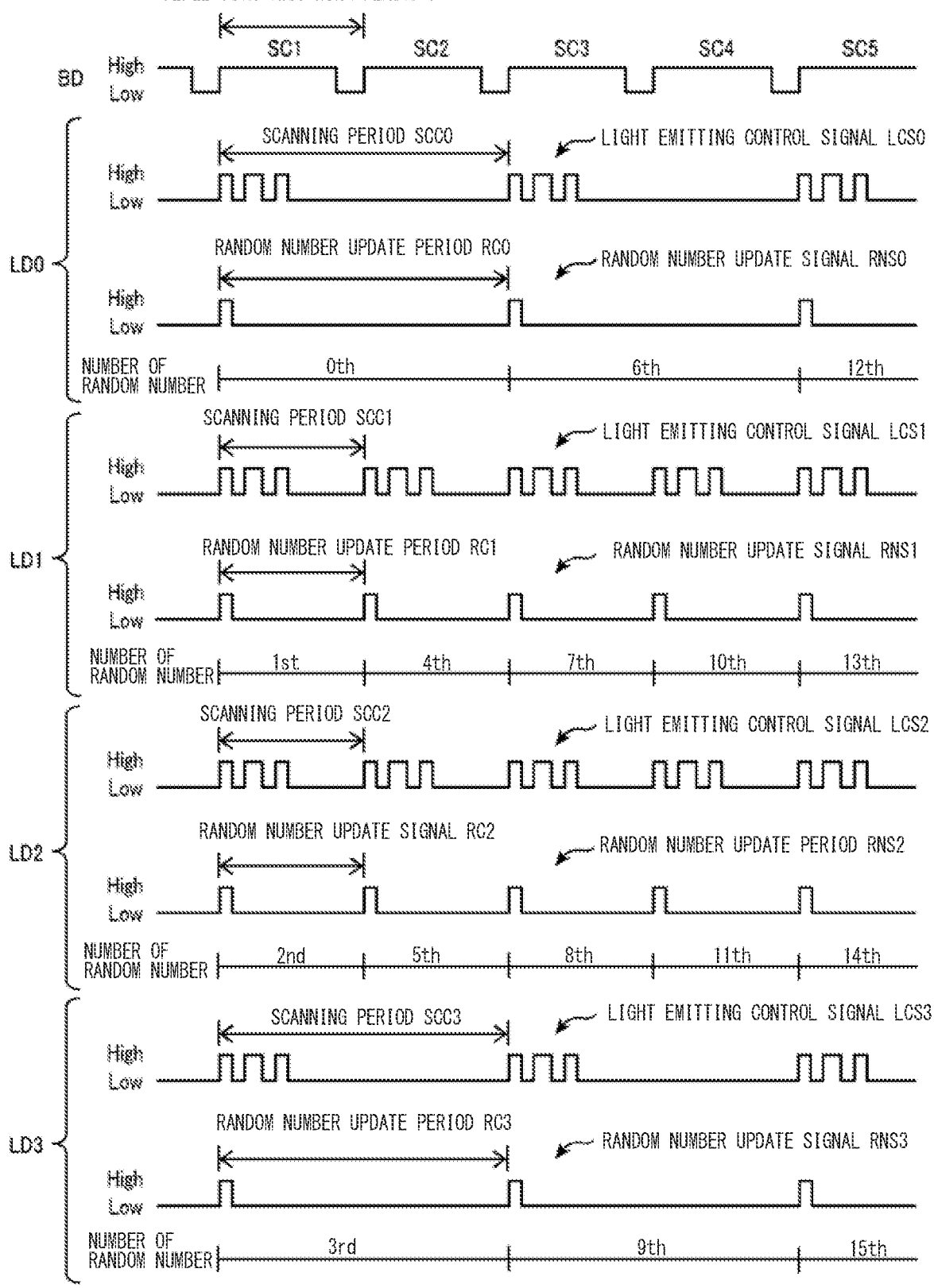
FIG. 9 is a view showing a random number assignment processing by a random number assignment part and an exposure processing by an exposure control part when the first selection processing is executed by the selection part.

<First Example of Each Processing of Selection Part, Random Number Assignment Part and Exposure Control Part> A first example of each processing of the selection part 912, the random number assignment part 913 and the exposure control part 914 will be described with reference to FIG. 8 and FIG. 9. FIG. 8 is a view showing a state where the circumferential surface 211 of the photosensitive drum 21 is scanned with the light beam emitted from the target emitting part in the main scanning direction D1 when the first selection processing is executed by the selection part 912. FIG. 9 is a view explaining the random number assignment processing by the random number assignment part 913 and the exposure processing based on the light emitting control signal by the exposure control part 914 when the first selection processing is executed by the selection part 912. In FIG. 8, the left-and-right direction on a paper plane on which FIG. 8 is drawn corresponds to the main scanning direction D1 on the circumferential surface 211 of the photosensitive drum 21 and the upper-and-lower direction on the paper plane corresponds to the sub-scanning direction D2 on the circumferential surface 211 of the photosensitive drum 21. In the left side portion in FIG. 8, a positional relationship of the four light emitting parts LD0 to LD3 capable of being used for the scanning using each deflection surface 621 is shown. In the right side portion in FIG. 8, each pixel of the electrostatic latent image formed on the circumferential surface 211 is shown.

In the first example, it is assumed that a density (for example, 600 dpi) of the pixel of the image to be formed on the sheet in the sub-scanning direction D2 is set to ½ of a density (for example, 1200 dpi) of the light emitting parts LD0 to LD3 of the light source 51 in the sub scanning direction D2 as the condition for image forming processing, and each pixel of the electrostatic latent image corresponding to the image is formed by scanning the pixel with the two light beams. Further, in the first example, it is assumed that the first to the fifth scanning SC1 to SC5 in the main scanning direction D1 are sequentially performed using the first to the fifth deflection surfaces 621 of the polygon mirror 62, and each pixel of the electrostatic latent image on different position in the sub-scanning direction D2 is formed. In the first example, it is assumed that the target sheet to which the image is formed is a thick paper as the condition for the image forming processing. Then, the mode switching control part 916 selects the second mode to switch the state of the image forming apparatus 1 into the second mode.

The setting part 911 sets the rotational speeds of the photosensitive drum 21 and the polygon mirror 62 such that when the four light beams LB-0 to LB-3 capable of being emitted from the light source 51 are emitted to each of two deflection surfaces 621 adjacently to each other, one position (the positions of the fourth, the seventh, the tenth and the thirteenth arrows in FIG. 8) on the circumferential surface 211 in the sub-scanning direction D2 is scanned with the two beams LB-3 and LB-0 different from each other.

Specifically, the setting part 911 sets an initial value (for example, the first speed V1) of the rotational speed of the photosensitive drum 21 previously stored in the storage part 95 as the rotational speed of the photosensitive drum 21. Then, the setting part 911 sets the rotational speed of the polygon mirror 62 such that the scanning positions on the circumferential surface 211 with the two light beams LB-0 and LB-3 in the sub-scanning direction D2 coincide with each other when the light emitting part LD3 disposed on the most downstream in the sub-scanning direction D2 in the light source 51 among the four light emitting parts LD0 to LD3 emits the light beam LB-3 to the first deflection surface 621 and when the light emitting part LD0 disposed on the most upstream in the sab-scanning direction D2 in the light source 51 among the four light emitting parts LD0 to LD3 emits the light beam LD-0 to the second deflection surface 621 adjacently to the first deflection surface 621.

The selection part 912 executes a first selection processing in which the two light emitting parts emitting the two light beams used for forming each pixel PX of the electrostatic latent image are selected among the four light emitting parts LD0 to LD3 included in the light source 51 as the set of target light emitting parts, and a combination of the light emitting parts constituting the set of target light emitting parts is changed for each position of the pixel PX in the sub-scanning direction D2. In the first selection processing, the selection part 912 selects the set of target light emitting parts while changing the combination of the light emitting part for each position of the pixel PX of the electrostatic latent image in the sub-scanning direction D2 such that a number of the light beam emitted to the first deflection surface 621 is the same four as a number of the light emitting parts included in the light source 51 and a number of the light beam emitted to the second deflection surface 621 is two smaller than the number of the light emitting parts included in the light source 51. The selection part 912 repeats the selection processing for the first and the second deflection surfaces 621 for the third to the sixth deflection surfaces 621 disposed on the downstream side of the second deflection surface 621 in the rotational direction in the polygon mirror 62.

In the example shown in FIG. 8, the selection part 912, in the first scanning SC1 using the first deflection surface 621, selects the two light emitting parts LD0 and LD1 emitting the two light beams LB-0 and LB-1 used for forming the pixels PX111, PX112 and PX113 arranged in the main scanning direction D1 at the most upstream position in the sub-scanning direction D2 as the set of target light emitting parts. Further, the selection part 912, in the first scanning SC1 using the first deflection surface 621, selects the two light emitting parts LD2 and LD3 emitting the two light beams LB-2 and LB-3 used for forming the pixels PX121, PX122 and PX123 arranged in the main canning direction D1 at the position adjacent to the downstream side of the pixels PX111, PX112 and PX113 in the sub-scanning direction D2 as the set of target light emitting parts.

The selection part 912, in the second scanning SC2 using the second deflection surface 621, selects the two light emitting parts LD1 and LD2 emitting the two light beams LB-1 and LB-2 used for forming the pixels PX211, PX212 and PX213 arranged in the main scanning direction D1 at the position adjacent to the downstream side of the pixels PX121, PX122 and PX123 in the sub-scanning direction D2 as the set of target light emitting parts.

The selection part 912, in the third scanning SC3 using the third deflection surface 621, selects the two light emitting parts LD0 and LD1 emitting the two light beams LB-0 and LB-1 used for forming the pixels PX311, PX312 and PX313 arranged in the main scanning direction D1 at the position adjacent to the downstream of the pixels PX211, PX212 and PX213 in the sub-scanning direction D2 as the set of target light emitting parts. Further, the selection part 912, in the third scanning SC3 using the third deflection surface 621, selects the two light emitting parts LD2 and LD3 emitting the two light beams LB-2 and LB-3 used for forming the pixels PX321, PX322 and PX323 arranged in the main scanning direction D1 at the position adjacent to the downstream side of the pixels PX311, PX312 and PX313 in the sub-scanning direction D2 as the set of target light emitting parts.

The selection part 912, in the fourth scanning SC4 using the fourth deflection surface 621, selects the two light emitting parts LD1 and LD2 emitting the two light beams LB-1 and LB-2 used for forming the pixels PX411, PX412 and PX413 arranged in the main scanning direction D1 at the position adjacent to the downstream side of the pixels PX321, PX322 and PX323 in the sub-scanning direction D2 as the set of target light emitting parts.

The selection part 912, in the fifth scanning SC5 using the fifth deflection surface 621, selects the two light emitting parts LD0 and LD1 emitting the two light beams LB-0 and LB-1 used for forming the pixels PX511, PX512 and PX513 arranged in the main scanning direction D1 at the position adjacent to the downstream of the pixels PX411, PX412 and PX413 in the sub-scanning direction D2 as the set of target light emitting parts. Further, the selection part 912, in the fifth scanning SC6 using the fifth deflection surface 621, selects the two light emitting parts LD2 and LD3 emitting the two light beams LB-2 and LB-3 used for forming the pixels PX521, PX522 and PX523 arranged in the main scanning direction D1 at the position adjacent to the downstream side of the pixels PX511, PX512 and PX513 in the sub-scanning direction D2 as the set of target light emitting parts.

As described above, when the first selection processing is executed by the selection part 912, all the four light emitting parts LD0 to LD3 included in the light source 51 emit the light beams in the first scanning SC1 using the first deflection surface 621, the third scanning SC3 using the third deflection surface 621 and the fifth scanning SC5 using the fifth deflection surface 621. On the other hand, the two light emitting parts LD0 and LD3 are in the light emitting stop state without selected as the target light emitting part in the second scanning SC2 using the second deflection surface 621 and the fourth scanning SC4 using the fourth deflection surface 621. In this case, of all the four light emitting parts LD0 to LD3 selected as the target light emitting parts for the first, the third and the fifth deflection surfaces 621, the scanning period SCC1 of the light emitting part LD1 and the scanning period SCC2 of the light emitting part LD2 selected as the target light emitting part for the second and the fourth deflection surfaces 621 coincide with a deflection switching period PC indicating a period in which the target deflection surface 621 to be emitted with the light beam is switched (see FIG. 9). On the other hand, of all the four light emitting parts LD0 to LD3 selected as the target light emitting parts for the first, the third and the fifth deflection surfaces 621, the scanning period SCC0 of the light emitting part LD0 and the scanning period SCC3 of the light emitting part LD3 not selected as the target light emitting part for the second and the fourth deflection surfaces 621 are longer than the deflection switching period PC, and are twice as long as the deflection switching period PC (see FIG. 9). The deflection switching period PC coincides with a period in which the low-level signal is output from the first BD sensor 75a and the second BD sensor 75B.

That is, when the first selection processing is executed by the selection part 912, the scanning periods SCC0 and SCC1 of the two light emitting parts LD0 and LD1 emitting the light beam to the first, the third and the fifth deflection surfaces 621 contain a period coinciding with the deflection switching period PC and a period longer than the deflection switching period PC, and are different from each other. In the same manner, the scanning periods SCC2 and SCC3 of the two light emitting parts LD2 and LD3 emitting the light beam to the first, the third and the fifth deflection surfaces 621 contain a period coinciding with the deflection switching period PC and a period longer than the deflection switching period PC, and are different from each other. On the other hand, the scanning periods SCC1 and SCC2 of the two light emitting parts LD1 and LD2 emitting the light beam to the second and the fourth deflection surfaces 621 coincide with the deflection switching period PC, and are the same scanning period.

The random number assignment part 913 executes a random number assignment processing in which the random number update signals RNS0 to RNS3 are output so as to assign the random number sequence individually to each light emitting part constituting the set of target light emitting parts selected by the selection part 912 and to update the assignment of the random number sequence at the random number update periods RC0 to RC3 specified for each light emitting part constituting the set of target light emitting parts. As described above, the random number sequence is selected from the initial random number sequence used as a seed in the random number generator 23R and the plurality of pseudo random number sequences sequentially generated by the random number generator 23R, and serves as an index specifying a timing at which the light emitting period of each light emitting part is set to the correction value different from the predetermined reference value. Here, the random number update periods RC0 to RC3 specified for each light emitting part constituting the set of target light emitting parts coincide with the scanning periods SCC0 to SCC3 specified for each light emitting part constituting the set of target light emitting parts, respectively.

The random number assignment part 913 can set the random number update period based on the deflection switching period PC such that the random number update periods RC0 to RC3 coincide with the scanning periods SCC0 to SCC3 in each light emitting part constituting the set of target light emitting part.

Specifically, when the first selection processing is executed by the selection part 912, the random number assignment part 913 updates the assignment of the random number sequence to each of the two light emitting parts LD0 and LD1 emitting the light beam to the first, the third and the fifth deflection surfaces 621 at the different random number update periods RC0 and RC1 depending on a fact that the scanning period SCC0 is different from the scanning period SCC1. In the same manner, the random number assignment part 913 updates the assignment of the random number sequence to each of the two light emitting parts LD2 and LD3 emitting the light beam to the first, the third and the fifth deflection surfaces 621 at the different random number update periods RC2 and RC3 depending on a fact that the scanning period SCC2 is different from the scanning period SCC3. On the other hand, the random number assignment part 913 updates the assignment of the random number sequence to each of the two light emitting parts LD1 and LD2 emitting the light beam to the second and the fourth deflection surfaces 621 at the same random number update periods RC1 and RC2 depending on a fact that the scanning period SCC1 is the same as the scanning period SCC2.

In detail, the random number update period RC0 of the assignment of the random number sequence to the light emitting part LD0 depending on the outputting of the random number update signal RNS0 by the random number assignment part 913 coincides with the scanning period SCC0 of the light emitting part LD0, is longer than the deflection switching period PC, and is twice as long as the deflection switching period PC. The random number update period RC1 of the assignment of the random number sequence to the light emitting part LD1 depending on the outputting of the random number update signal RNS1 by the random number assignment part 913 coincides with the scanning period SCC1 of the light emitting part LD1, and coincides with the deflection switching period PC. The random number update period RC2 of the assignment of the random number sequence to the light emitting part LD2 depending on the outputting of the random number update signal RNS2 by the random number assignment part 913 coincides with the scanning period SCC2 of the light emitting part LD2, and coincides with the deflection switching period PC. The random number update period RC3 of the assignment of the random number sequence to the light emitting part LD3 depending on the outputting of the random number update signal RNS3 by the random number assignment part 913 coincides with the scanning period SCC3 of the light emitting part LD3, is longer than the deflection switching period PC, and is twice as long as the deflection switching period PC.

The random number assignment part 913 recognizes the consecutive numbers in the order of generation by the random number generator 23R for the initial random number sequence and the plurality of pseudo random number sequences when the assignment of the random number to each light emitting part constituting the set of target light emitting parts selected by the selection part 912 is updated. Specifically, the random number assignment part 913 recognizes the number of the initial random number sequence used as a seed in the random number generator 23R as "0", and the number of the plurality of random number sequences sequentially generated by the random number generator 23R as "1", "2", "3", "4", "5" . . . in the order of the generation. Then, the random number assignment part 913 sequentially assigns the random number sequences of the number according to the arithmetic progression specified for each light emitting part constituting the set of target light emitting parts, in which a tolerance depending on the random number update periods RC0 to RC3 specified for each light emitting part constituting the set of target light emitting parts is set for the arithmetic progression, to each light emitting part constituting the set of target light emitting parts.

Specifically, as shown in FIG. 9, the random number assignment part 913 sequentially assigns the random number sequence of the number according to the arithmetic progression An0=(0, 6, 12), in which the first term is "0" and the tolerance is "6" depending on the random number update period RC0, to the light emitting part LD0 in case of emitting the light beam LB-0 to the first, the third and the fifth deflection surfaces 621 by the light emitting part LD0. In this case, the initial random number sequence of the number "0" is assigned to the light emitting part LD0 in the first scanning SC1 using the first deflection surface 621. In the same manner, the pseudo random number sequence of the number "6" is assigned to the light emitting part LD0 in the third scanning SC3 using the third deflection surface 621, and the pseudo random number sequence of the number "12" is assigned to the light emitting part LD0 in the fifth scanning SC5 using the fifth deflection surface 621.

The random number assignment part 913 sequentially assigns the random number sequence of the number according to the arithmetic progression An1=(1, 4, 7, 10, 13), in which the first term is "1" and the tolerance is "3" depending on the random number update period RC1, to the light emitting part LD1 in case of emitting the light beam LB-1 to the first to the fifth deflection surfaces 621 by the light emitting part LD1. In this case, the pseudo random number sequence of the number "1" is assigned to the light emitting part LD1 in the first scanning SC1 using the first deflection surface 621. In the same manner, the pseudo random number sequence of the number "4" is assigned to the light emitting part LD1 in the second scanning SC2 using the second deflection surface 621, and the pseudo random number sequence of the number "7" is assigned to the light emitting part LD1 in the third scanning SC3 using the third deflection surface 621. The pseudo random number sequence of the number "10" is assigned to the light emitting part LD1 in the fourth scanning SC4 using the fourth deflection surface 621, and the pseudo random number sequence of the number "13" is assigned to the light emitting part LD1 in the fifth scanning SC5 using the fifth deflection surface 621.

The random number assignment part 913 sequentially assigns the random number sequence of the number according to the arithmetic progression An1=(2, 5, 8, 11, 14), in which the first term is "2" and the tolerance is "3" depending on the random number update period RC2, to the light emitting part LD2 in case of emitting the light beam LB-2 to the first to the fifth deflection surfaces 621 by the light emitting part LD2. In this case, the pseudo random number sequence of the number "2" is assigned to the light emitting part LD2 in the first scanning SC1 using the first deflection surface 621. In the same manner, the pseudo random number sequence of the number "5" is assigned to the light emitting part LD2 in the second scanning SC2 using the second deflection surface 621, and the pseudo random number sequence of the number "8" is assigned to the light emitting part LD2 in the third scanning SC3 using the third deflection surface 621. The pseudo random number sequence of the number "11" is assigned to the light emitting part LD2 in the fourth scanning SC4 using the fourth deflection surface 621, and the pseudo random number sequence of the number "14" is assigned to the light emitting part LD2 in the fifth scanning SC5 using the fifth deflection surface 621.

The random number assignment part 913 sequentially assigns the random number sequence of the number according to the arithmetic progression An3=(3, 9, 15), in which the first term is "3" and the tolerance is "6" depending on the random number update period RC3, to the light emitting part LD3 in case of emitting the light beam LB-3 to the first, the third and the fifth deflection surfaces 621 by the light emitting part LD3. In this case, the pseudo random number sequence of the number "3" is assigned to the light emitting part LD3 in the first scanning SC1 using the first deflection surface 621. In the same manner, the pseudo random number sequence of the number "9" is assigned to the light emitting part LD3 in the third scanning SC3 using the third deflection surface 621, and the pseudo random number sequence of the number "15" is assigned to the light emitting part LD3 in the fifth scanning SC5 using the fifth deflection surface 621.

When the numbers of the random number sequences assigned to the four light emitting parts LD0 to LD3 selected as the target light emitting part as described above are arranged in the order of the first to the fifth scanning SC1 to SC5, it is shown that 0, 1, 2, . . . 13, 14, 15. That is, the random number assignment part 913 updates the assignment of the random number sequence to the light emitting parts LD0 to LD3 such that the order of the scanning in the main scanning direction D1 for each position in the sub-scanning direction D2 coincides with the order of the generation of the random number sequence by the random number generator 23R. In other words, in the scanning in the main scanning direction D1 by the light beams emitted from the light emitting parts LD0 to LD3, the preceding and the succeeding pseudo random number sequences are assigned in the order of the generation by the random number generator 23R depending on the scanning adjacent to in the sub-scanning direction D2. In the random number generator 23R including the LFSR 23RA, an uncorrelation of the pseudo random number sequence is especially guaranteed between the preceding and the succeeding pseudo random number sequences in the order of the generation. Then, it becomes possible to maintain the irregularity of the position of the target pixel to be corrected depending on the random number sequence in the electrostatic latent image. The detail will be described later.

The exposure control part 914 outputs light emitting control signals LCS0 to LCS3 individually for the light emitting parts LD0 to LD3 selected as the target light emitting part for each position of the pixel PX of the electrostatic latent image in the sub-scanning direction D2. Then, the exposure control part 914 executes an exposure processing in which the light emitting parts LD0 to LD3 are caused to emit the light beams LB-0 to LB-3. As described above, each of the light emitting signals LSC0 to LCS3 is a pulse signal based on the image data for forming the electrostatic latent image, and containing the reference pulse and the correction pulse corresponding to the random number sequence assigned to each of the light emitting parts LD0 to LD3.

In the first scanning SC1 using the first deflection surface 621, the light emitting parts LD0 and LD1 selected as the set of target light emitting parts emit the light beams LB-0 and LB-1 by the light emitting at the light emitting times indicated by the reference values according to the reference pulses included in the light emitting control signals LCS0 and LCS1. In addition, the light emitting parts LD0 and LD1 emit the light beams LB-0 and LB-1 by the light emitting at the light emitting times indicated by the correction values according to the correction pulses included in the light emitting control signals LCS0 and LCS1. As a result, the pixels PX111, PX112, and PX113 arranged in the main scanning direction D1 at the most upstream position in the sub-scanning direction D2 are formed. At this time, based on the correction pulses included in the light emitting control signals LCS0 and LCS1, a correction processing (an equal-magnification correction processing) in which the light emitting times of the light emitting parts LD0 and LD1 are set to the correction values is executed, and the pixel width of the target pixel to be corrected in the main scanning direction D1 according to the random number sequence is adjusted.

Furthermore, in the first scanning SC1 using the first deflection surface 621, the light emitting parts LD2 and LD3 selected as the set of target light emitting parts emit light beams LB-2 and LB-3 by the light emitting at the light emitting times indicated by the reference values according to the reference pulses included in the light emitting control signals LCS2 and LCS3. In addition, the light emitting parts LD2 and LD3 emit the light beams LB-2 and LB-3 by the light emitting at the light emitting times indicated by the correction values according to the correction pulses included in the light emitting control signals LCS2 and LCS3. As a result, the pixels PX121, PX122, and PX123 arranged in the main scanning direction D1 at the positions adjacent to the downstream side of the pixels PX111, PX112 and PX 113 in the sub-scanning direction D2 are formed. At this time, based on the correction pulses included in the light emitting control signals LCS2 and LCS3, the correction processing in which the light emitting times of the light emitting parts LD2 and LD3 are set to the correction values is executed, and the pixel width in the main scanning direction D1 of the target pixel to be corrected according to the random number sequence is adjusted.

In the third scanning SC3 using the third deflection surface 621, in the same manner as the first scanning SC1, the light emitting parts LD0 and LD1 emit the light beams LB-0 and LB-1 to form the pixels PX311, PX312 and PX313, and the light emitting parts LD2 and LD3 emit the light beams LB-2 and LB-3 to form the pixels PX321, PX322 and PX323.

In the fourth scanning SC4 using the fourth deflection surface 621, in the same manner as the second scanning SC2, the light emitting parts LD1 and LD2 emit the light beams LB-1 and LB-2 to form the pixels PX411, PX412 and PX413.

In the fifth scanning SC5 using the fifth deflection surface 621, in the same manner as the first scanning SC1, the light emitting parts LD0 and LD1 emit the light beams LB-0 and LB-1 to form the pixels PX511, PX512 and PX 513, and the light emitting parts LD2 and LD3 emit the light beams LB-2 and LB-3 to form the pixels PX521, PX522 and PX523.

As described above, in each of the first to the fifth scanning SC1 to SC5, the random number update periods RC0 to RC3 specified for the light emitting parts LD0 to LD3 selected as the set of target light emitting parts coincides with the scanning periods SCC0 to SCC3, respectively. In this case, after the scanning in the main scanning direction D1 is performed by emitting the light beams LB-0 to LB-3 in the light emitting parts LD0 to LD3, at a timing at which the next scanning is performed after the scanning periods SCC0 to SCC3 elapse, the random number update periods RC0 to RC3 elapse at the same time and the assignment of the random number sequence is updated (see FIG. 9).

In such an example of the update of the random number sequence, it becomes possible to avoid the useless update of the assignment of the random number sequence in a period in which the light emitting is stopped without emitting the light beam for scanning in the main scanning direction D1. Thereby, the random number assignment part 913 makes it possible to effectively assign the pseudo random number sequence generated within a range of the random number period previously set in the random number generator 23R to the light emitting parts LD0 to LD3 emitting the light beams for scanning in the main scanning direction D1. Therefore, it becomes possible to avoid a fact that the same random number sequence as the already assigned pseudo random number sequence generated at a timing exceeding the random number period in the random number generator 23R is assigned to the light emitting parts LD0 to LD3, as much as possible. As a result, when the correction processing in which the light emitting times of the light emitting parts LD0 to LD3 are set to the correction values based on the light emitting control signals LCS0 to LCS3 output from the exposure control part 914, the irregularity of the position of the target pixel to be corrected according to the random number sequence can be maintained.

When the irregularity of the position of the target pixel to be corrected in the electrostatic latent image is maintained, it becomes possible to avoid a fact that a spatial frequency relating to the density unevenness depending on the target pixel to be corrected is larger than a minimum value of a visible spatial frequency by a person in the image formed on the sheet corresponding to the electrostatic latent image. As a result, it becomes possible to suppress the deterioration of the image quality of the image on the sheet. Accordingly, when the optical path distortion occurs in the optical scanning device 23, it becomes possible to appropriately suppress an occurrence of a phenomenon in which the pixel width of the electrostatic latent image is not uniform in the main scanning direction D1.

Figure 10:
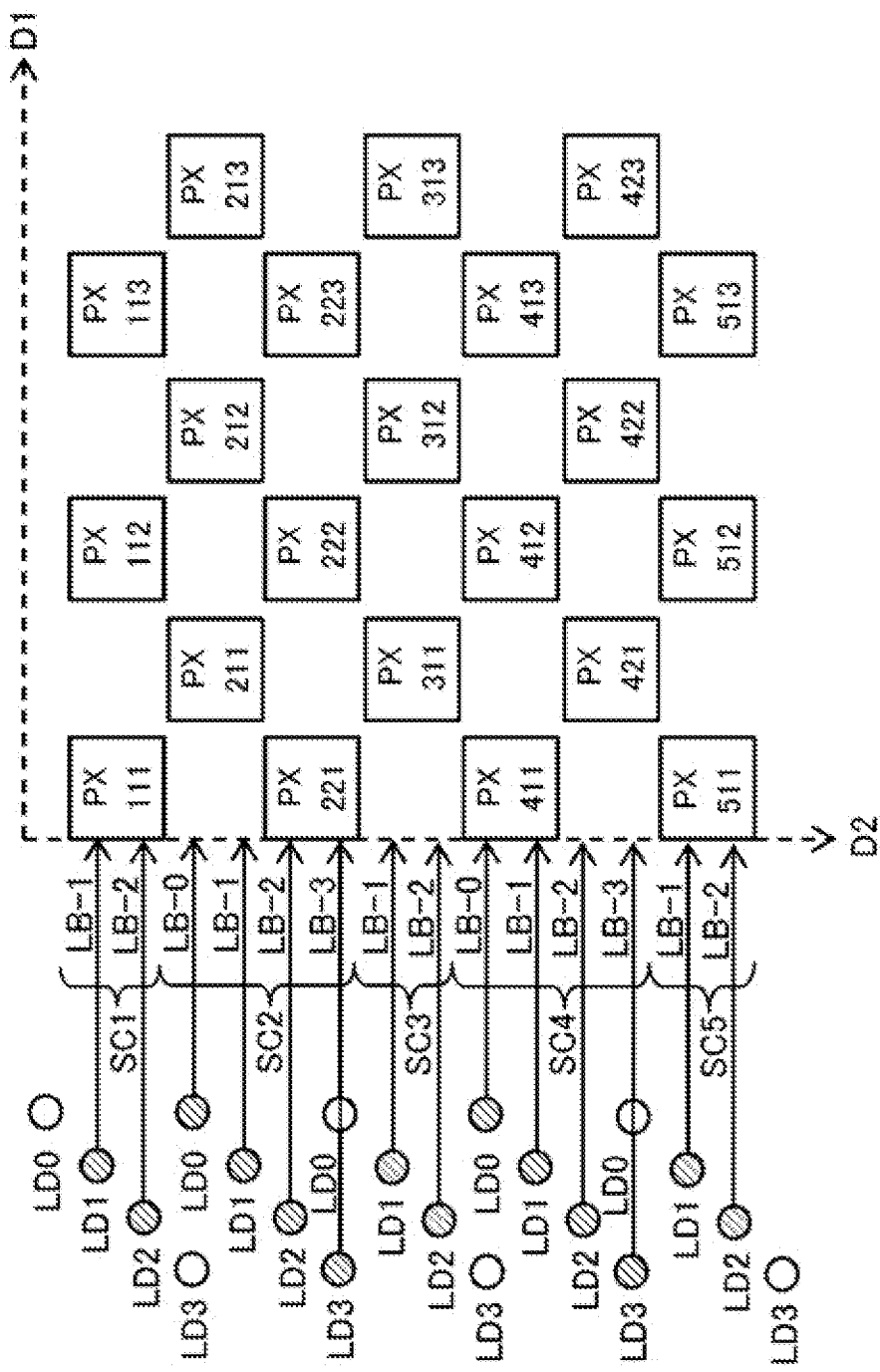
FIG. 10 is a view showing a state where the circumferential surface is scanned in the main scanning direction with the light beam emitted from the target light emitting part when a second selection processing is executed by the selection part.
Figure 11:
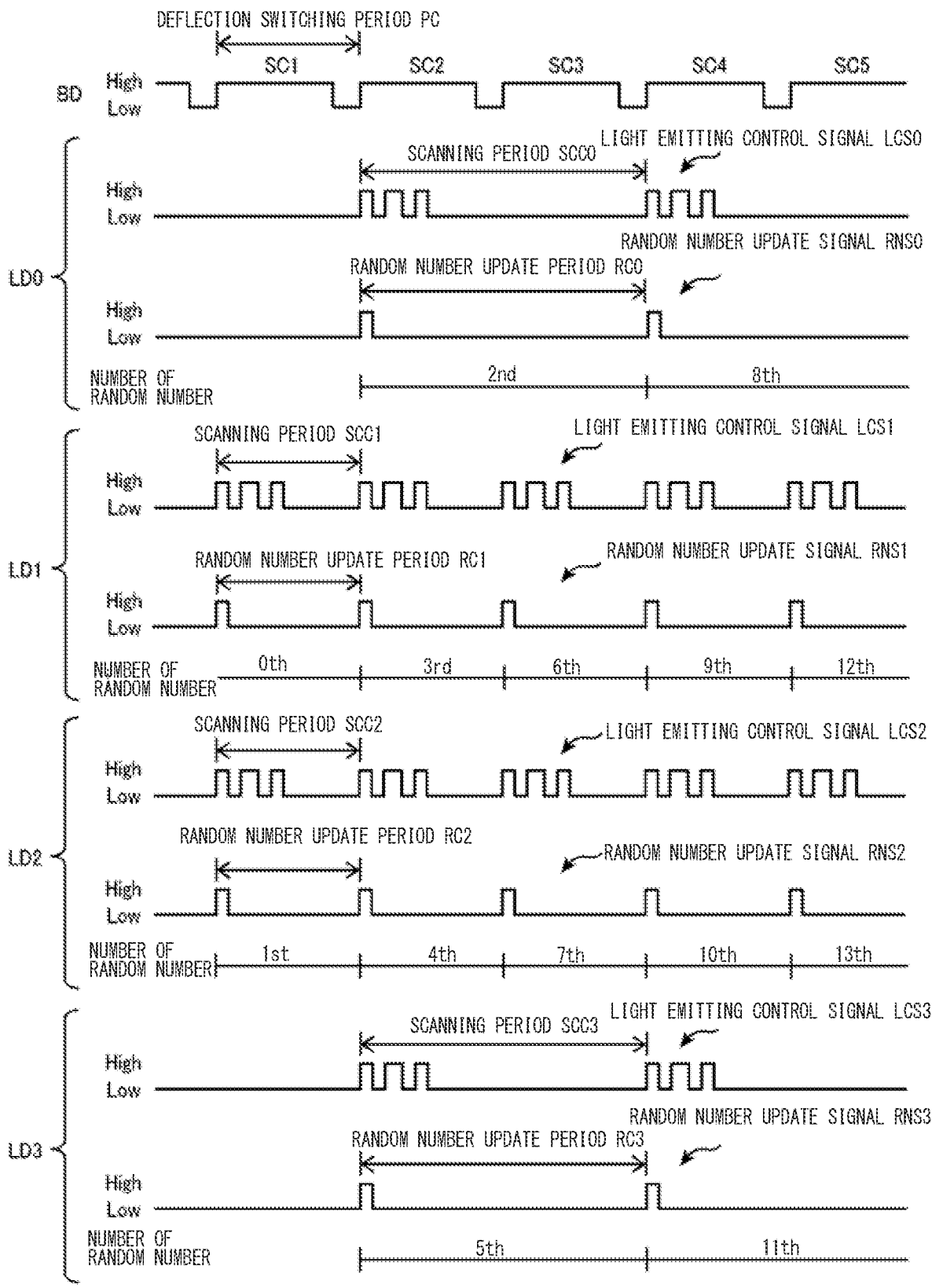
FIG. 11 is a view showing the random number assignment processing by the random number assignment part and the exposure processing by the exposure control part when the second selection processing is executed by the selection part.

<Second Example of Each Processing of Selection Part, Random Number Assignment Part and Exposure Control Part> A second example of each processing of the selection part 912, the random number assignment part 913 and the exposure control part 914 will be described with reference to FIG. 10 and FIG. 11. FIG. 10 is a view showing a state where the circumferential surface 211 of the photosensitive drum 21 is scanned with the light beam emitted from the target emitting part in the main scanning direction D1 when the second selection processing is executed by the selection part 912. FIG. 11 is a view explaining the random number assignment processing by the random number assignment part 913 and the exposure processing based on the light emitting control signal by the exposure control part 914 when the second selection processing is executed by the selection part 912.

In the second example, in the same manner as the above first example, as the condition for the image forming processing it is assumed that each pixel of the electrostatic latent image corresponding to the image formed on the sheet is formed by scanning with the two light beams. In the second example, it is assumed that the first to the fifth scanning SC1 to SC5 in the main scanning direction D1 are sequentially performed using the first to the fifth deflection surfaces 621 of the polygon mirror 62, and each pixel of the electrostatic latent image on different position in the sub-scanning direction D2 is formed. In the second example, in the same manner as the above first example, the mode switching control part 916 selects the second mode to switch the state of the image forming apparatus 1 into the second mode.

The setting part 911 sets an initial value (for example, the first speed V1) of the rotational speed of the photosensitive drum 21 previously stored in the storage part 95 as a rotational speed of the photosensitive drum 21. Then, the setting part 911 sets a rotational speed of the polygon mirror 62 such that the scanning positions on the circumferential surface 211 with the two light beams LB-3 and LB-0 in the sub-scanning direction D2 coincide with each other when the light emitting part LD3 emits the light beam LB-3 to the first deflection surface 621 and when the light emitting part LD0 emits the light beam LB-0 to the second deflection surface 621 adjacently to the first deflection surface 621.

The selection part 912 executes a second selection processing in which the set of target light emitting parts is selected while changing the combination of the light emitting parts for each position of the pixel PX of the electrostatic latent image in the sub-scanning direction D2 such that a number of the light beam emitted to the first deflection surface 621 is two, that is smaller than the number of the light emitting parts included in the light source 51 and a number of the light beam emitted to the second deflection surface 621 is four, that is the same as the number of the light emitting parts included in the light source 51. The selection part 912 repeats the selection processing for the first and the second deflection surfaces 621 for the third to the sixth deflection surfaces 621 disposed on the downstream side of the second deflection surface 621 in the rotational direction in the polygon mirror 62.

In the example shown in FIG. 10, the selection part 912, in the first scanning SC1 using the first deflection surface 621, selects the two light emitting parts LD1 and LD2 emitting the two light beams LB-1 and LB-2 used for forming the pixels PX111, PX112 and PX113 arranged in the main scanning direction D1 at the most upstream position in the sub-scanning direction D2 as the set of target light emitting parts.

The selection part 912, in the second scanning SC2 using the second deflection surface 621, selects the two light emitting parts LD0 and LD1 emitting the two light beams LB-0 and LB-1 used for forming the pixels PX211, PX212 and PX213 arranged in the main scanning direction D1 at the position adjacent to the downstream side of the pixels PX111, PX112 and PX113 in the sub-scanning direction D2 as the set of target light emitting parts. Further, the selection part 912, in the second scanning SC2 using the second deflection surface 621, selects the two light emitting parts LD2 and LD3 emitting the two light beams LB-2 and LB-3 used for forming the pixels PX221, PX222 and PX223 arranged in the main scanning direction D1 at the position adjacent to the downstream side of the pixels PX211, PX212 and PX213 in the sub-scanning direction D2 as the set of target light emitting parts.

The selection part 912, in the third scanning SC3 using the third deflection surface 621, selects the two light emitting parts LD1 and LD2 emitting the two light beams LB-1 and LB-2 used for forming the pixels PX311, PX312 and PX313 arranged in the main scanning direction D1 at the position adjacent to the downstream of the pixels PX221, PX222 and PX223 in the sub-scanning direction D2 as the set of target light emitting parts.

The selection part 912, in the fourth scanning SC4 using the fourth deflection surface 621, selects the two light emitting parts LD0 and LD1 emitting the two light beams LB-0 and LB-1 used for forming the pixels PX411, PX412 and PX413 arranged in the main scanning direction D1 at the position adjacent to the downstream side of the pixels PX311, PX312 and PX313 in the sub-scanning direction D2 as the set of target light emitting parts. Further, the selection part 912, in the fourth scanning SC4 using the fourth deflection surface 621, selects the two light emitting parts LD2 and LD3 emitting the two light beams LB-2 and LB-3 used for forming the pixels PX421, PX422 and PX423 arranged in the main scanning direction D1 at the position adjacent to the downstream side of the pixels PX411, PX412 and PX413 in the sub-scanning direction D2 as the set of target light emitting parts.

The selection part 912, in the fifth scanning SC5 using the fifth deflection surface 621, selects the two light emitting parts LD1 and LD2 emitting the two light beams LB-1 and LB-2 used for forming the pixels PX511, PX512 and PX513 arranged in the main scanning direction D1 at the position adjacent to the downstream of the pixels PX421, PX422 and PX423 in the sub-scanning direction D2 as the set of target light emitting parts.

As described above, when the second selection processing is executed by the selection part 912, in the first scanning SC1 using the first deflection surface 621, the third scanning SC3 using the third deflection surface 621 and the fifth scanning SC5 using the fifth deflection surface 621, the two light emitting parts LD0 and LD3 are in the light emitting stop state without selected as the target light emitting part. On the other hand, all the four light emitting parts LD0 to LD3 included in the light source 51 emit the light beams in the second scanning SC2 using the second deflection surface 621 and the fourth scanning SC4 using the fourth deflection surface 621. In this case, the light emitting parts LD1 and LD2 selected as the target light emitting parts for the first, the third and the fifth deflection surfaces 621 are also selected as the target light emitting part for the second and the fourth deflection surfaces 621. Then, the scanning period SCC1 of the light emitting part LD1 and the scanning period SCC2 of the light emitting part LD2 selected as the target light emitting part for the first, the third and the fifth deflection surfaces 621 coincide with the deflection switching period PC (see FIG. 11). On the other hand, of all the four light emitting parts LD0 to LD3 selected as the target light emitting parts for the second and the fourth deflection surfaces 621, the scanning period SCC0 of the light emitting part LD0 and the scanning period SCC3 of the light emitting part LD3 not selected as the target light emitting part for the first, the third and the fifth deflection surfaces 621 are longer than the deflection switching period PC and are twice as long as the deflection switching period PC (see FIG. 11).

That is, when the second selection processing is executed by the selection part 912, the scanning periods SCC1 and SCC2 of the two light emitting parts LD1 and LD2 emitting the light beam to the first, the third and the fifth deflection surfaces 621 coincide with the deflection switching period PC and are the same scanning period. On the other hand, the scanning periods SCC0 and SCC1 of the two light emitting parts LD0 and LD1 emitting the light beam to the second and the fourth deflection surfaces 621 contain a period coinciding with the deflection switching period PC and a period longer than the deflection switching period PC, and are different from each other. In the same manner, the scanning periods SCC2 and SCC3 of the two light emitting parts LD2 and LD3 emitting the light beam to the second and the fourth deflection surfaces 621 contain a period coinciding with the deflection switching period PC and a period longer than the deflection switching period PC, and are different from each other.

The random number assignment part 913 executes a random number assignment processing in which the random number update signals RNS0 to RNS3 are output so as to assign the random number sequence individually to each light emitting part constituting the set of target light emitting parts selected by the selection part 912 and to update the assignment of the random number sequence at the random number update periods RC0 to RC3 specified for each light emitting part constituting the set of target light emitting parts. Here, the random number update periods RC0 to RC3 specified for each light emitting part constituting the set of target light emitting parts coincide with the scanning periods SCC0 to SCC3 specified for each light emitting part constituting the set of target light emitting parts, respectively.

The random number assignment part 913 can set the random number update period based on the deflection switching period PC such that the random number update periods RC0 to RC3 coincide with the scanning periods SCC0 to SCC3 in each light emitting part constituting the set of target light emitting part.

Specifically, when the second selection processing is executed by the selection part 912, the random number assignment part 913 updates the assignment of the random number sequence to each of the two light emitting parts LD1 and LD2 emitting the light beam to the first, the third and the fifth deflection surfaces 621 at the same random number update periods RC1 and RC2 depending on a fact that the scanning period SCC1 is the same as the scanning period SCC2. On the other hand, the random number assignment part 913 updates the assignment of the random number sequence to each of the two light emitting parts LD0 and LD1 emitting the light beam to the second and the fourth deflection surfaces 621 at the different random number update periods RC0 and RC1 depending on a fact that the scanning period SCC0 is different from the scanning period SCC1. In the same manner, the random number assignment part 913 updates the assignment of the random number sequence to each of the two light emitting parts LD2 and LD3 emitting the light beam to the second and the fourth deflection surfaces 621 at the different random number update periods RC2 and RC3 depending on a fact that the scanning period SCC2 is different from the scanning period SCC3.

In detail, the random number update period RC0 of the assignment of the random number sequence to the light emitting part LD0 depending on the outputting of the random number update signal RNS0 by the random number assignment part 913 coincides with the scanning period SCC0 of the light emitting part LD0, is longer than the deflection switching period PC, and is twice as long as the deflection switching period PC. The random number update period RC1 of the assignment of the random number sequence to the light emitting part LD1 depending on the outputting of the random number update signal RNS1 by the random number assignment part 913 coincides with the scanning period SCC1 of the light emitting part LD1, and coincides with the deflection switching period PC. The random number update period RC2 of the assignment of the random number sequence to the light emitting part LD2 depending on the outputting of the random number update signal RNS2 by the random number assignment part 913 coincides with the scanning period SCC2 of the light emitting part LD2, and coincides with the deflection switching period PC. The random number update period RC3 of the assignment of the random number sequence to the light emitting part LD3 depending on the outputting of the random number update signal RNS3 by the random number assignment part 913 coincides with the scanning period SCC3 of the light emitting part LD3, is longer than the deflection switching period PC, and is twice as long as the deflection switching period PC.

When the assignment of the random number sequence to each light emitting part constituting the set of target light emitting parts selected by the selection part 912 is updated, in the same manner as the above first example, the random number assignment part 913 recognizes the number of the initial random number sequence used as a seed in the random number generator 23R as "0", and the number of the plurality of random number sequences sequentially generated by the random number generator 23R as "1", "2", "3", "4", "5" . . . in the order of the generation. Then, the random number assignment part 913 sequentially assigns the random number sequences of the number according to the arithmetic progression specified for each light emitting part constituting the set of target light emitting parts, in which a tolerance depending on the random number update periods RC0 to RC3 specified for each light emitting part constituting the set of target light emitting parts is set for the arithmetic progression, to each light emitting part constituting the set of target light emitting parts.

Specifically, as shown in FIG. 11, the random number assignment part 913 sequentially assigns the random number sequence of the number according to the arithmetic progression An0=(2, 8), in which the first term is "0" and the tolerance is "6" depending on the random number update period RC0, to the light emitting part LD0 in case of emitting the light beam LB-0 to the second and the fourth deflection surfaces 621 by the light emitting part LD0. In this case, the pseudo random number sequence of the number "2" is assigned to the light emitting part LD0 in the second scanning SC2 using the second deflection surface 621. In the same manner, the pseudo random number sequence of the number "8" is assigned to the light emitting part LD0 in the fourth scanning SC4 using the fourth deflection surface 621.

The random number assignment part 913 sequentially assigns the random number sequence of the number according to the arithmetic progression An1=(0, 3, 6, 9, 12), in which the first term is "0" and the tolerance is "3" depending on the random number update period RC1, to the light emitting part LD1 in case of emitting the light beam LB-1 to the first to the fifth deflection surfaces 621 by the light emitting part LD1. In this case, the initial random number sequence of the number "0" is assigned to the light emitting part LD1 in the first scanning SC1 using the first deflection surface 621. In the same manner, the pseudo random number sequence of the number "3" is assigned to the light emitting part LD1 in the second scanning SC2 using the second deflection surface 621, and the pseudo random number sequence of the number "6" is assigned to the light emitting part LD1 in the third scanning SC3 using the third deflection surface 621. The pseudo random number sequence of the number "9" is assigned to the light emitting part LD1 in the fourth scanning SC4 using the fourth deflection surface 621, and the pseudo random number sequence of the number "12" is assigned to the light emitting part LD1 in the fifth scanning SC5 using the fifth deflection surface 621.

The random number assignment part 913 sequentially assigns the random number sequence of the number according to the arithmetic progression An1=(1, 4, 7, 10, 13), in which the first term is "1" and the tolerance is "3" depending on the random number update period RC2, to the light emitting part LD2 in case of emitting the light beam LB-2 to the first to the fifth deflection surfaces 621 by the light emitting part LD2. In this case, the pseudo random number sequence of the number "1" is assigned to the light emitting part LD2 in the first scanning SC1 using the first deflection surface 621. In the same manner, the pseudo random number sequence of the number "4" is assigned to the light emitting part LD2 in the second scanning SC2 using the second deflection surface 621, and the pseudo random number sequence of the number "7" is assigned to the light emitting part LD2 in the third scanning SC3 using the third deflection surface 621. The pseudo random number sequence of the number "10" is assigned to the light emitting part LD2 in the fourth scanning SC4 using the fourth deflection surface 621, and the pseudo random number sequence of the number "13" is assigned to the light emitting part LD2 in the fifth scanning SC5 using the fifth deflection surface 621.

The random number assignment part 913 sequentially assigns the random number sequence of the number according to the arithmetic progression An3=(5, 11), in which the first term is "5" and the tolerance is "6" depending on the random number update period RC3, to the light emitting part LD3 in case of emitting the light beam LB-3 to the second and the fourth deflection surfaces 621 by the light emitting part LD3. In this case, the pseudo random number sequence of the number "5" is assigned to the light emitting part LD3 in the second scanning SC2 using the second deflection surface 621. In the same manner, the pseudo random number sequence of the number "11" is assigned to the light emitting part LD3 in the fourth scanning SC3 using the fourth deflection surface 621.

When the numbers of the random number sequences assigned to the four light emitting parts LD0 to LD3 selected as the target light emitting part as described above are arranged in the order of the first to the fifth scanning SC1 to SC5, it is shown that 0, 1, 2, . . . 11, 12, 13. That is, the random number assignment part 913 updates the assignment of the random number sequence to the light emitting parts LD0 to LD3 such that the order of the scanning in the main scanning direction D1 for each position in the sub-scanning direction D2 coincides with the order of the generation of the random number sequence by the random number generator 23R.

The exposure control part 914 outputs the light emitting control signals LCS0 to LCS3 individually for the light emitting parts LD0 to LD3 selected as the target light emitting part for each position of the pixel PX of the electrostatic latent image in the sub-scanning direction D2. Then, the exposure control part 914 executes an exposure processing in which the light emitting parts LD0 to LD3 are caused to emit the light beams LB-0 to LB-3. Each of the light emitting signals LSC0 to LCS3 is a pulse signal containing the reference pulse and the correction pulse corresponding to the random number sequence assigned to each of the light emitting parts LD0 to LD3.

In the first scanning SC1 using the first deflection surface 621, the light emitting parts LD1 and LD2 selected as the set of target light emitting parts emit the light beams LB-1 and LB-2 by the light emitting at the light emitting times indicated by the reference values according to the reference pulses included in the light emitting control signals LCS1 and LCS2. In addition, the light emitting parts LD1 and LD2 emit the light beams LB-1 and LB-2 by the light emitting at the light emitting times indicated by the correction values according to the correction pulses included in the light emitting control signals LCS1 and LCS2. As a result, the pixels PX111, PX112, and PX113 arranged in the main scanning direction D1 at the most upstream position in the sub-scanning direction D2 are formed. At this time, based on the correction pulses included in the light emitting control signals LCS1 and LCS2, the correction processing in which the light emitting times of the light emitting parts LD1 and LD2 are set to the correction values is executed, and the pixel width of the target pixel to be corrected in the main scanning direction D1 according to the random number sequence is adjusted.

In the second scanning SC2 using the second deflection surface 621, the light emitting parts LD0 and LD1 selected as the set of target light emitting parts emit light beams LB-0 and LB-1 by the light emitting at the light emitting times indicated by the reference values according to the reference pulses included in the light emitting control signals LCS0 and LCS1. The light emitting parts LD0 and LD1 emit the light beams LB-0 and LB-1 by the light emitting at the light emitting times indicated by the correction values according to the correction pulses included in the light emitting control signals LCS0 and LCS1. As a result, the pixels PX221, PX222, and PX223 arranged in the main scanning direction D1 at the positions adjacent to the downstream side of the pixels PX111, PX112 and PX 113 in the sub-scanning direction D2 are formed. At this time, based on the correction pulses included in the light emitting control signals LCS0 and LCS1, the correction processing in which the light emitting times of the light emitting parts LD0 and LD1 are set to the correction values is executed, and the pixel width in the main scanning direction D1 of the target pixel to be corrected according to the random number sequence is adjusted.

Further, in the second scanning SC2 using the second deflection surface 621, the light emitting parts LD2 and LD3 selected as the set of target light emitting parts emit light beams LB-2 and LB-3 by the light emitting at the light emitting times indicated by the reference values according to the reference pulses included in the light emitting control signals LCS2 and LCS3. The light emitting parts LD2 and LD3 emit the light beams LB-2 and LB-3 by the light emitting at the light emitting times indicated by the correction values according to the correction pulses included in the light emitting control signals LCS2 and LCS3. As a result, the pixels PX221, PX222, and PX223 arranged in the main scanning direction D1 at the positions adjacent to the downstream side of the pixels PX211, PX212 and PX213 in the sub-scanning direction D2 are formed. At this time, based on the correction pulses included in the light emitting control signals LCS2 and LCS3, the correction processing in which the light emitting times of the light emitting parts LD2 and LD3 are set to the correction values is executed, and the pixel width in the main scanning direction D1 of the target pixel to be corrected according to the random number sequence is adjusted.

In the third scanning SC3 using the third deflection surface 621, in the same manner as the first scanning SC1, the light emitting parts LD1 and LD2 emit the light beams LB-1 and LB-2 to form the pixels PX311, PX312 and PX313.

In the fourth scanning SC4 using the fourth deflection surface 621, in the same manner as the second scanning SC2, the light emitting parts LD0 and LD1 emit the light beams LB-0 and LB-1 to form the pixels PX411, PX412 and PX413, and the light emitting parts LD2 and LD3 emit the light beams LB-2 and LB-3 to form the pixels PX421, PX422 and PX423.

In the fifth scanning SC5 using the fifth deflection surface 621, in the same manner as the first scanning SC1, the light emitting parts LD1 and LD2 emit the light beams LB-1 and LB-2 to form the pixels PX511, PX512 and PX513.

As described above, in each of the first to the fifth scanning SC1 to SC5, the random number update periods RC0 to RC3 specified for the light emitting parts LD0 to LD3 selected as the set of target light emitting parts coincides with the scanning periods SCC0 to SCC3, respectively. In this case, after the scanning in the main scanning direction D1 is performed by emitting the light beams LB-0 to LB-3 in the light emitting parts LD0 to LD3, at a timing at which the next scanning is performed after the scanning periods SCC0 to SCC3 elapse, the random number update periods RC0 to RC3 elapse at the same time and the assignment of the random number sequence is updated (see FIG. 11). Therefore, it becomes possible to avoid the useless update of the assignment of the random number sequence in a period in which the light emitting is stopped without emitting the light beam for scanning in the main scanning direction D1. Thereby, when the correction processing in which the light emitting times of the light emitting parts LD0 to LD3 are set to the correction values based on the light emitting control signals LCS0 to LCS3 output from the exposure control part 914, the irregularity of the position of the target pixel according to the random number sequence can be maintained. Accordingly, when the optical path distortion occurs in the optical scanning device 23, it becomes possible to appropriately suppress an occurrence of a phenomenon in which the pixel width of the electrostatic latent image is not uniform in the main scanning direction D1.

Figure 12:
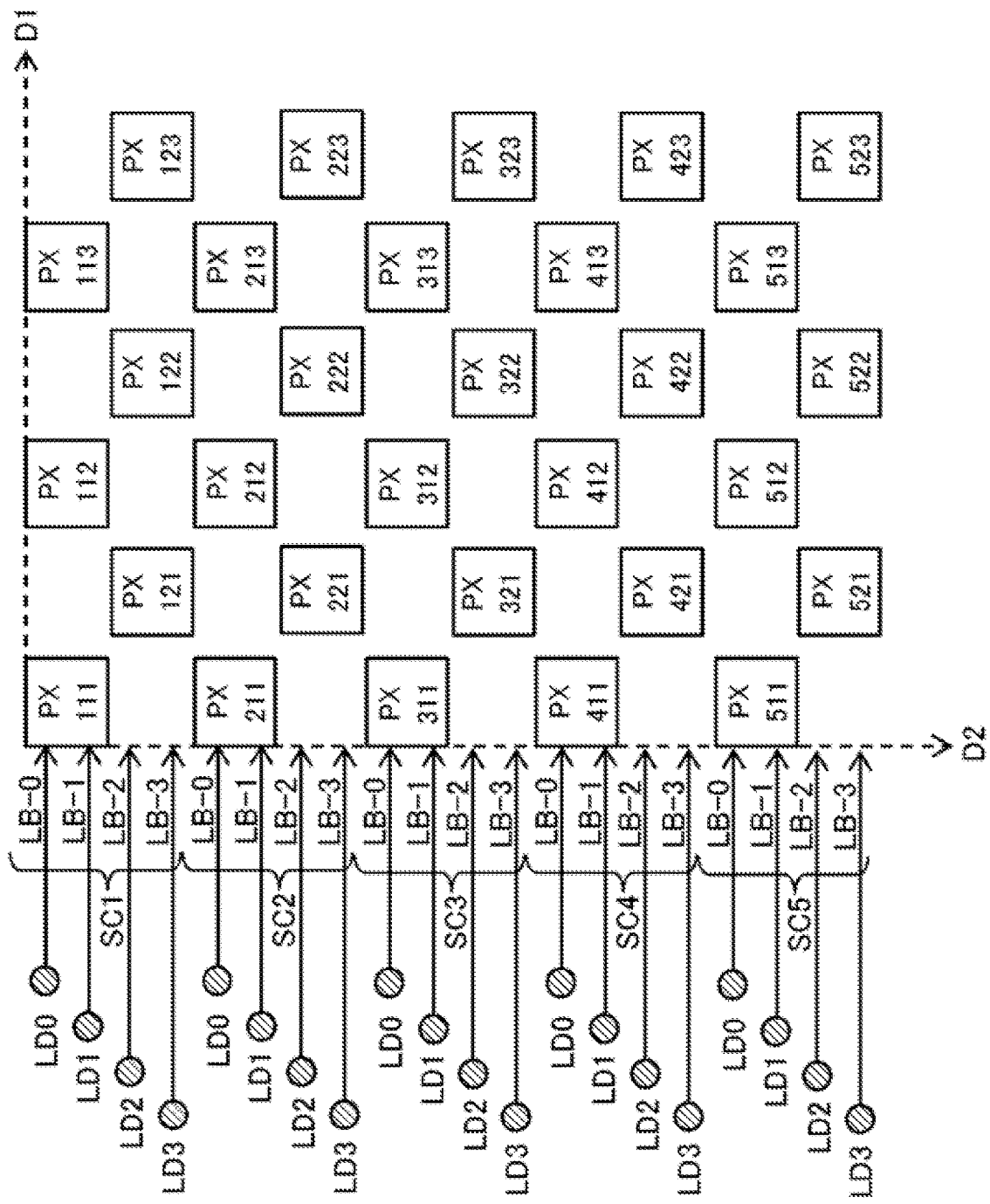
FIG. 12 is a view showing a state where the circumferential surface is scanned in the main scanning direction with the light beam emitted from the target light emitting part when a third selection processing is executed by the selection part.
Figure 13:
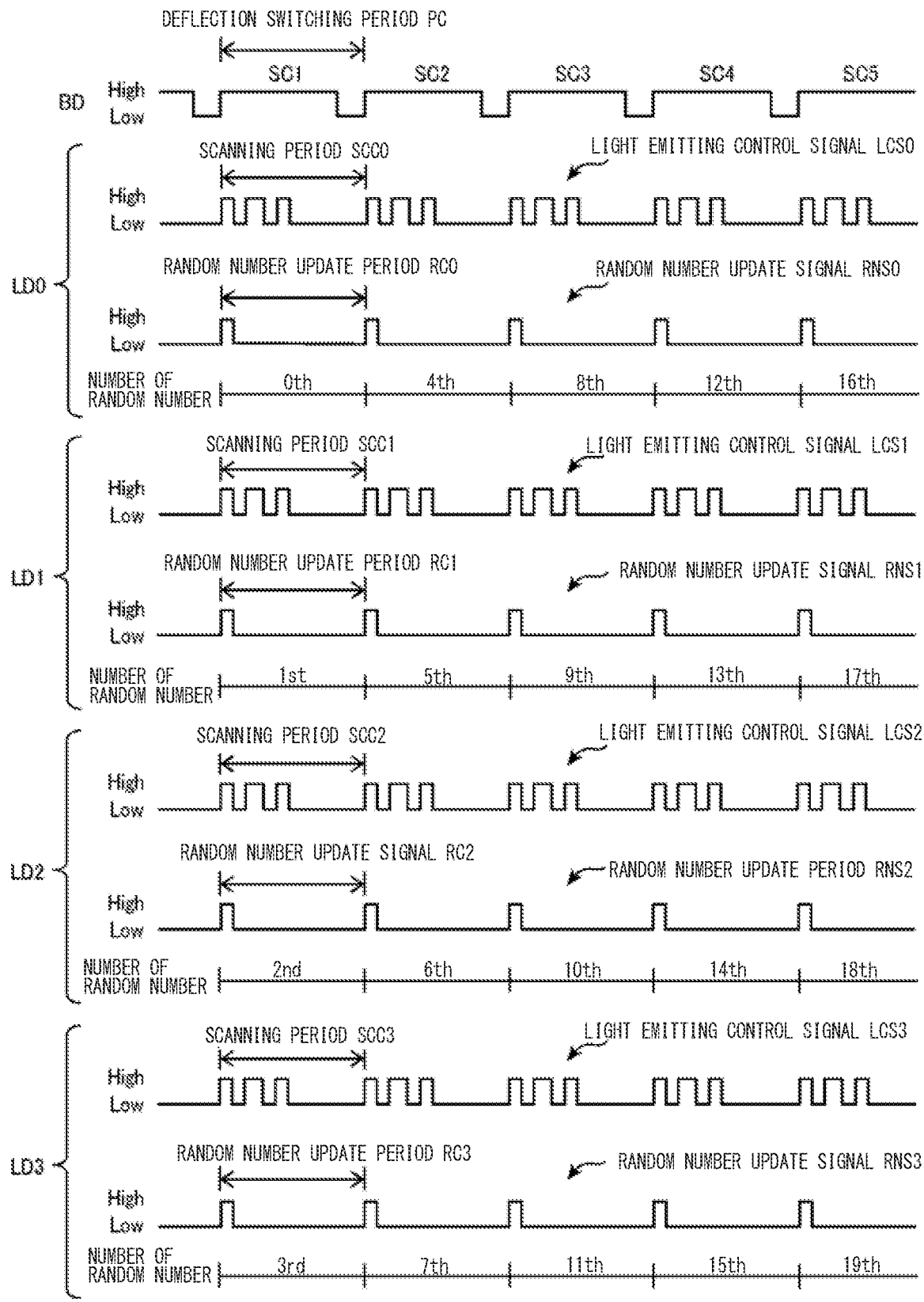
FIG. 13 is a view showing the random number assignment processing by the random number assignment part and the exposure processing by the exposure control part when the third selection processing is executed by the selection part.

<Third Example of Each Processing of Selection Part, Random Number Assignment Part and Exposure Control Part> A third example of each processing of the selection part 912, the random number assignment part 913 and the exposure control part 914 will be described with reference to FIG. 12 and FIG. 13. FIG. 12 is a view showing a state where the circumferential surface 211 of the photosensitive drum 21 is scanned with the light beam emitted from the target emitting part in the main scanning direction D1 when the third selection processing is executed by the selection part 912. FIG. 13 is a view explaining the random number assignment processing by the random number assignment part 913 and the exposure processing based on the light emitting control signal by the exposure control part 914 when the third selection processing is executed by the selection part 912.

In the third example, as the condition for the image forming processing, it is assumed that each pixel of the electrostatic latent image corresponding to the image formed on the sheet is formed by scanning with the two light beams. In the third example, it is assumed that the first to the fifth scanning SC1 to SC5 in the main scanning direction D1 are sequentially performed using the first to the fifth deflection surfaces 621 of the polygon mirror 62, and each pixel of the electrostatic latent image on different position in the sub-scanning direction D2 is formed. In the third example, in the same manner as the above first example, as the condition for the image forming processing, it is assumed that the sheet on which the image is formed is a plain paper. Then, the mode switching control part 916 selects the first mode to switch the state of the image forming apparatus 1 into the first mode.

The setting part 911 sets an initial value (for example, the first speed V1) of the rotational speed of the photosensitive drum 21 previously stored in the storage part 95 as a rotational speed of the photosensitive drum 21. Then, the setting part 911 sets a rotational speed of the polygon mirror 62 such that when the light beams LB-0 to LB-3 capable of being emitted from the light source 51 are emitted to each of the adjacent two deflection surfaces 621, each of the light beams LB-0 to LB-3 scans the circumferential surface 211 at positions separated from each other by a sub-scanning pitch PD2 in the sub-scanning direction D2.

The selection part 912 executes a third selection processing in which the set of target light emitting parts is selected while changing the combination of the light emitting part for each position of each pixel PX of the electrostatic latent image in the sub-scanning direction D2 such that a number of the light beam emitted to each of the first to the fifth deflection surfaces 621 is four, that is the same as a number of the light emitting parts included in the light source 51.

In the example shown in FIG. 12, the selection part 912, in the first scanning SC1 using the first deflection surface 621, selects the two light emitting parts LD0 and LD1 emitting the two light beams LB-0 and LB-1 used for forming the pixels PX111, PX112 and PX113 arranged in the main scanning direction D1 at the most upstream position in the sub-scanning direction D2 as the set of target light emitting parts. Further, the selection part 912, in the first scanning SC1 using the first deflection surface 621, selects the two light emitting parts LD2 and LD3 emitting the two light beams LB-2 and LB-3 used for forming the pixels PX121, PX122 and PX133 arranged in the main scanning direction D1 at the position adjacent to the downstream side of the pixels PX111, PX112 and PX113 in the sub-scanning direction D2 as the set of target light emitting parts.

The selection part 912, in the second scanning SC2 using the second deflection surface 621, selects the two light emitting parts LD0 and LD1 emitting the two light beams LB-0 and LB-1 used for forming the pixels PX211, PX212 and PX213 arranged in the main scanning direction D1 at the position adjacent to the downstream side of the pixels PX121, PX122 and PX123 in the sub-scanning direction D2 as the set of target light emitting parts. Further, the selection part 912, in the second scanning SC2 using the second deflection surface 621, selects the two light emitting parts LD2 and LD3 emitting the two light beams LB-2 and LB-3 used for forming the pixels PX221, PX222 and PX223 arranged in the main scanning direction D1 at the position adjacent to the downstream side of the pixels PX211, PX212 and PX213 in the sub-scanning direction D2 as the set of target light emitting parts.

The selection part 912, in the third scanning SC3 using the third deflection surface 621, selects the two light emitting parts LD0 and LD1 emitting the two light beams LB-0 and LB-1 used for forming the pixels PX311, PX312 and PX313 arranged in the main scanning direction D1 at the position adjacent to the downstream of the pixels PX221, PX222 and PX223 in the sub-scanning direction D2 as the set of target light emitting parts. Further, the selection part 912, in the third scanning SC3 using the third deflection surface 621, selects the two light emitting parts LD2 and LD3 emitting the two light beams LB-2 and LB-3 used for forming the pixels PX321, PX322 and PX323 arranged in the main scanning direction D1 at the position adjacent to the downstream of the pixels PX311, PX312 and PX313 in the sub-scanning direction D2 as the set of target light emitting parts.

The selection part 912, in the fourth scanning SC4 using the fourth deflection surface 621, selects the two light emitting parts LD0 and LD1 emitting the two light beams LB-0 and LB-1 used for forming the pixels PX411, PX412 and PX413 arranged in the main scanning direction D1 at the position adjacent to the downstream side of the pixels PX321, PX322 and PX323 in the sub-scanning direction D2 as the set of target light emitting parts. Further, the selection part 912, in the fourth scanning SC4 using the fourth deflection surface 621, selects the two light emitting parts LD2 and LD3 emitting the two light beams LB-2 and LB-3 used for forming the pixels PX421, PX422 and PX423 arranged in the main scanning direction D1 at the position adjacent to the downstream side of the pixels PX411, PX412 and PX413 in the sub-scanning direction D2 as the set of target light emitting parts.

The selection part 912, in the fifth scanning SC5 using the fifth deflection surface 621, selects the two light emitting parts LD0 and LD1 emitting the two light beams LB-0 and LB-1 used for forming the pixels PX511, PX512 and PX513 arranged in the main scanning direction D1 at the position adjacent to the downstream of the pixels PX421, PX422 and PX423 in the sub-scanning direction D2 as the set of target light emitting parts. Further, the selection part 912, in the fifth scanning SC5 using the fifth deflection surface 621, selects the two light emitting parts LD2 and LD3 emitting the two light beams LB-2 and LB-3 used for forming the pixels PX521, PX522 and PX523 arranged in the main scanning direction D1 at the position adjacent to the downstream of the pixels PX511, PX512 and PX513 in the sub-scanning direction D2 as the set of target light emitting parts.

As described above, when the third selection processing is executed by the selection part 912, in the first to the fifth scanning SC1 to SC5 using the first to the fifth deflection surfaces 621, all the four light emitting parts LD0 to LD3 emit the light beams. Therefore, the scanning periods SCC0 to SCC3 of the four light emitting parts selected as the target light emitting part corresponding to the first to the fifth deflection surfaces 621 coincide to the deflection period PC (see FIG. 13). That is, when the third selection processing is executed by the selection part 912, the scanning periods SCC0 to SCC3 of the four light emitting parts LD0 to LD3 coincide with the deflection switching period PC, and are the same scanning period.

The random number assignment part 913 can set the random number update period based on the deflection switching period PC such that the random number update periods RC0 to RC3 coincide with the scanning period SCC0 to SCC3 in each of the light emitting parts LD to LD3 selected as the target light emitting part.

Specifically, when the third selection processing is executed by the selection part 912, the random number assignment part 913 updates the assignment of the random number sequence to each of the two light emitting parts LD0 and LD1 emitting the light beam to the first to the fifth deflection surfaces 621 at the same random number update periods RC0 and RC1 depending on a fact that the scanning period SCC0 is the same as the scanning period SCC1. In the same manner, the random number assignment part 913 updates the assignment of the random number sequence to each of the two light emitting parts LD2 and LD3 emitting the light beam to the first to the fifth deflection surfaces 621 at the same random number update periods RC2 and RC3 depending on a fact that the scanning period SCC2 is the same as the scanning period SCC3.

When the assignment of the random number sequence to each light emitting part constituting the set of target light emitting parts selected by the selection part 912 is updated, in the same manner as the above first example, the random number assignment part 913 recognizes the number of the initial random number sequence used as a seed in the random number generator 23R as "0", and the number of the plurality of random number sequences sequentially generated by the random number generator 23R as "1", "2", "3", "4", "5" . . . in the order of the generation. Then, the random number assignment part 913 sequentially assigns the random number sequences of the number according to the arithmetic progression specified for each light emitting part constituting the set of target light emitting parts, in which a tolerance depending on the random number update periods RC0 to RC3 specified for each light emitting part constituting the set of target light emitting parts is set for the arithmetic progression, to each light emitting part constituting the set of target light emitting parts.

Specifically, as shown in FIG. 13, the random number assignment part 913 sequentially assigns the random number sequence of the number according to the arithmetic progression An0=(0, 4, 8, 12, 16), in which the first term is "0" and the tolerance is "4" depending on the random number update period RC0, to the light emitting part LD0 in case of emitting the light beam LB-0 to the first to the fifth deflection surfaces 621 by the light emitting part LD0. In this case, the initial random number sequence of the number "0" is assigned to the light emitting part LD0 in the first scanning SC1 using the first deflection surface 621. In the same manner, the pseudo random number sequence of the number "4" is assigned to the light emitting part LD0 in the second scanning SC2 using the second deflection surface 621, and the pseudo random number sequence of the number "8" is assigned to the light emitting part LD0 in the third scanning SC3 using the third deflection surface 621. Further, the pseudo random number sequence of the number "12" is assigned to the light emitting part LD0 in the fourth scanning SC4 using the fourth deflection surface 621, and the pseudo random number sequence of the number "16" is assigned to the light emitting part LD0 in the fifth scanning SC5 using the fifth deflection surface 621.

The random number assignment part 913 sequentially assigns the random number sequence of the number according to the arithmetic progression An1=(1, 5, 9, 13, 17), in which the first term is "1" and the tolerance is "4" depending on the random number update period RC1, to the light emitting part LD1 in case of emitting the light beam LB-1 to the first to the fifth deflection surfaces 621 by the light emitting part LD1. In this case, the pseudo random number sequence of the number "1" is assigned to the light emitting part LD1 in the first scanning SC1 using the first deflection surface 621. In the same manner, the pseudo random number sequence of the number "5" is assigned to the light emitting part LD1 in the second scanning SC2 using the second deflection surface 621, and the pseudo random number sequence of the number "9" is assigned to the light emitting part LD1 in the third scanning SC3 using the third deflection surface 621. The pseudo random number sequence of the number "13" is assigned to the light emitting part LD1 in the fourth scanning SC4 using the fourth deflection surface 621, and the pseudo random number sequence of the number "17" is assigned to the light emitting part LD1 in the fifth scanning SC5 using the fifth deflection surface 621.

The random number assignment part 913 sequentially assigns the random number sequence of the number according to the arithmetic progression An1=(2, 6, 10, 14, 18), in which the first term is "2" and the tolerance is "4" depending on the random number update period RC2, to the light emitting part LD2 in case of emitting the light beam LB-2 to the first to the fifth deflection surfaces 621 by the light emitting part LD2. In this case, the pseudo random number sequence of the number "2" is assigned to the light emitting part LD2 in the first scanning SC1 using the first deflection surface 621. In the same manner, the pseudo random number sequence of the number "6" is assigned to the light emitting part LD2 in the second scanning SC2 using the second deflection surface 621, and the pseudo random number sequence of the number "10" is assigned to the light emitting part LD2 in the third scanning SC3 using the third deflection surface 621. The pseudo random number sequence of the number "14" is assigned to the light emitting part LD2 in the fourth scanning SC4 using the fourth deflection surface 621, and the pseudo random number sequence of the number "18" is assigned to the light emitting part LD2 in the fifth scanning SC5 using the fifth deflection surface 621.

The random number assignment part 913 sequentially assigns the random number sequence of the number according to the arithmetic progression An3=(3, 7, 11, 15, 19), in which the first term is "3" and the tolerance is "4" depending on the random number update period RC3, to the light emitting part LD3 in case of emitting the light beam LB-3 to the first to the fifth deflection surfaces 621 by the light emitting part LD3. In this case, the pseudo random number sequence of the number "3" is assigned to the light emitting part LD3 in the first scanning SC1 using the first deflection surface 621. In the same manner, the pseudo random number sequence of the number "7" is assigned to the light emitting part LD3 in the second scanning SC2 using the second deflection surface 621, and the pseudo random number sequence of the number "11" is assigned to the light emitting part LD3 in the third scanning SC2 using the third deflection surface 621. The pseudo random number sequence of the number "15" is assigned to the light emitting part LD3 in the fourth scanning SC4 using the fourth deflection surface 621, and the pseudo random number sequence of the number "19" is assigned to the light emitting part LD3 in the fifth scanning SC5 using the fifth deflection surface 621.

When the numbers of the random number sequences assigned to the four light emitting parts LD0 to LD3 selected as the target light emitting part as described above are arranged in the order of the first to the fifth scanning SC1 to SC5, it is shown that 0, 1, 2, . . . 17, 18, 19. That is, the random number assignment part 913 updates the assignment of the random number sequence to the light emitting parts LD0 to LD3 such that the order of the scanning in the main scanning direction D1 for each position in the sub-scanning direction D2 coincides with the order of the generation of the random number sequence by the random number generator 23R.

The exposure control part 914 outputs the light emitting control signals LCS0 to LCS3 individually for the light emitting parts LD0 to LD3 selected as the target light emitting part for each position of the pixel PX of the electrostatic latent image in the sub-scanning direction D2. Then, the exposure control part 914 executes an exposure processing in which the light emitting parts LD0 to LD3 are caused to emit the light beams LB-0 to LB-3. Each of the light emitting signals LSC0 to LCS3 is a pulse signal containing the reference pulse and the correction pulse corresponding to the random number sequence assigned to each of the light emitting parts LD0 to LD3.

In the first scanning SC1 using the first deflection surface 621, the light emitting parts LD0 and LD1 selected as the set of target light emitting parts emit the light beams LB-0 and LB-1 by the light emitting at the light emitting times indicated by the reference values according to the reference pulses included in the light emitting control signals LCS0 and LCS1. In addition, the light emitting parts LD0 and LD1 emit the light beams LB-0 and LB-1 by the light emitting at the light emitting times indicated by the correction values according to the correction pulses included in the light emitting control signals LCS0 and LCS1. As a result, the pixels PX111, PX112, and PX113 arranged in the main scanning direction D1 at the most upstream position in the sub-scanning direction D2 are formed. At this time, based on the correction pulses included in the light emitting control signals LCS0 and LCS1, the correction processing in which the light emitting times of the light emitting parts LD0 and LD1 are set to the correction values is executed, and the pixel width of the target pixel to be corrected in the main scanning direction D1 according to the random number sequence is adjusted.

Furthermore, in the first scanning SC1 using the first deflection surface 621, the light emitting parts LD2 and LD3 selected as the set of target light emitting parts emit light beams LB-2 and LB-3 by the light emitting at the light emitting times indicated by the reference values according to the reference pulses included in the light emitting control signals LCS2 and LCS3. The light emitting parts LD2 and LD3 emit the light beams LB-2 and LB-3 by the light emitting at the light emitting times indicated by the correction values according to the correction pulses included in the light emitting control signals LCS2 and LCS3. As a result, the pixels PX121, PX122, and PX123 arranged in the main scanning direction D1 at the positions adjacent to the downstream side of the pixels PX111, PX112 and PX 113 in the sub-scanning direction D2 are formed. At this time, based on the correction pulses included in the light emitting control signals LCS2 and LCS3, the correction processing in which the light emitting times of the light emitting parts LD2 and LD3 are set to the correction values is executed, and the pixel width in the main scanning direction D1 of the target pixel to be corrected according to the random number sequence is adjusted.

In the second scanning SC2 using the second deflection surface 621, in the same manner as the first scanning SC1, the light emitting parts LD0 and LD1 emit the light beams LB-0 and LB-1 to form the pixels PX211, PX212 and PX213, and the light emitting parts LD2 and LD3 emit the light beams LB-2 and LB-3 to form the pixels PX221, PX222 and PX223.

In the third scanning SC3 using the third deflection surface 621, in the same manner as the first scanning SC2, the light emitting parts LD0 and LD1 emit the light beams LB-0 and LB-1 to form the pixels PX311, PX312 and PX313, and the light emitting parts LD2 and LD3 emit the light beams LB-2 and LB-3 to form the pixels PX321, PX322 and PX323.

In the fourth scanning SC4 using the fourth deflection surface 621, in the same manner as the first scanning SC1, the light emitting parts LD0 and LD1 emit the light beams LB-0 and LB-1 to form the pixels PX411, PX412 and PX413, and the light emitting parts LD2 and LD3 emit the light beams LB-2 and LB-3 to form the pixels PX421, PX422 and PX423.

In the fifth scanning SC5 using the fifth deflection surface 621, in the same manner as the first scanning SC1, the light emitting parts LD0 and LD1 emit the light beams LB-0 and LB-1 to form the pixels PX511, PX512 and PX 513, and the light emitting parts LD2 and LD3 emit the light beams LB-2 and LB-3 to form the pixels PX521, PX522 and PX523.

As described above, in each of the first to the fifth scanning SC1 to SC5, the random number update periods RC0 to RC3 specified for the light emitting parts LD0 to LD3 selected as the set of target light emitting parts coincides with the scanning periods SCC0 to SCC3, respectively. In this case, after the scanning in the main scanning direction D1 is performed by emitting the light beams LB-0 to LB-3 in the light emitting parts LD0 to LD3, at a timing at which the next scanning is performed after the scanning periods SCC0 to SCC3 elapse, the random number update periods RC0 to RC3 elapse at the same time and the assignment of the random number sequence is updated (see FIG. 13). Therefore, when the correction processing in which the light emitting times of the light emitting parts LD0 to LD3 are set to the correction values based on the light emitting control signals LCS0 to LCS3 output from the exposure control part 914, the irregularity of the position of the target pixel according to the random number sequence can be maintained. Accordingly, when the optical path distortion occurs in the optical scanning device 23, it becomes possible to appropriately suppress an occurrence of a phenomenon in which the pixel width of the electrostatic latent image is not uniform in the main scanning direction D1.

The present disclosure may be changed, substituted, or modified in various ways without departing from the spirit of the technical idea, and the claims include all embodiments which may be included within the scope of the technical idea.

The invention claimed is:

1. An optical scanning device comprising:
a light source including a plurality of light emitting parts emitting a light beam, the light emitting parts arranged in a predetermined direction at fixed intervals in a sub-scanning direction;
a deflector formed into a polygonal prism rotating around an axis and having deflection surfaces formed in each side surface of the polygonal prism, the deflection surface reflecting the light beam to scan a circumferential surface of an image carrier rotating around an axis with the light beam in a main scanning direction;
a random number generator which sequentially generates a plurality of pseudo random number sequence with an initial random number sequence having a predetermined bit length as a seed, the pseudo random number sequence having a same bit length as the bit length of the initial random number sequence;
a selection part configured to select the two light emitting parts as a set of target emitting parts among the light emitting parts, the target emitting parts arranged adjacently to each other in the predetermined direction and capable of emitting the light beams at the same time to one of the deflection surfaces in order to form one pixel of an electrostatic latent image to be formed on the circumferential surface by the two light beams, and to change a combination of the light emitting parts constituting the set of target light emitting parts for each position of the pixel of the electrostatic latent image in the sub-scanning direction;
a random number assignment part configured to assign the random number sequence selected from the initial random number sequence and the pseudo random number sequences individually to each light emitting part constituting the set of target light emitting parts as an index for specifying a timing at which a light emitting time at the light beam emitting of the set of target light emitting parts is set to a correction value different from a predetermined reference value, and to update the assignment of the random number sequence at a random number update period specified for each light emitting part constituting the set of target light emitting parts; and an exposure control part configured to output a light emitting control signal containing a pulse individually for each light emitting part constituting the set of target light emitting parts and to cause each light emitting part constituting the set of target light emitting parts to emit the two light beams, the pulse serving as an index of a timing for causing each light emitting part constituting the set of target light emitting parts to emit the light beam and having a pulse width which defines the light emitting time and is different between the width corresponding to the reference value and the width corresponding to the correction value, wherein the random number update period specified for each light emitting part constituting the set of target light emitting parts coincides with a scanning period specified for each light emitting part constituting the set of target light emitting parts, the scanning period indicating a scanning period in which the light beam emitted from each light emitting part constituting the set of target light emitting parts scans the circumferential surface in the main scanning direction.

2. The optical scanning device according to claim 1, wherein the deflector includes a first deflection surface and a second deflection surface adjacent to a downstream side of the first deflection surface in a rotational direction of the deflector as the deflection surface, the selection part is configured to execute a first selection processing in which the set of target light emitting parts is selected while changing the combination of the light emitting parts for each position of the pixel in the sub-scanning direction such that a number of the light beam emitted to the first deflection surface is a same as a number of the light emitting part and a number of the light beam emitted to the second deflection surface is smaller than the number of the light emitting part, and when the first selection processing is executed by the selection part, the random number assignment part updates the assignment of the random number sequence at the different random number update period for each light emitting part constituting the set of target light emitting parts emitting the light beam to the first deflection surface and updates the assignment of the random number sequence at the same random number update period for each light emitting part constituting the set of target light emitting parts emitting the light beam to the second deflection surface.

3. The optical scanning device according to claim 2, wherein the selection part is configured to execute a second selection processing in which the set of target light emitting parts is selected while changing the combination of the light emitting part for each position of the pixel in the sub-scanning direction such that a number of the light beam emitted to the first deflection surface is smaller than the number of the light emitting parts and a number of the light beam emitted to the second deflection surface is a same as the number of the light emitting parts, and when the second selection processing is executed by the selection part, the random number assignment part updates the assignment of the random number sequence at the same random number update period for each light emitting part constituting the set of target light emitting parts emitting the light beam to the first deflection surface and updates the assignment of the random number sequence at the different random number update period for each light emitting part constituting the set of target light emitting parts emitting the light beam to the second deflection surface.

4. The optical scanning device according to claim 2, wherein the selection part is configured to execute a third selection processing in which the set of target light emitting parts is selected while changing the combination of the light emitting part for each position of the pixel in the sub-scanning direction such that a number of the light beams emitted to each of the first deflection surface and the second deflection surface is a same as the number of the light emitting parts, and when the third selection processing is executed by the selection part, the random number assignment part updates the assignment of the random number sequence to each light emitting part constituting the set of target light emitting parts emitting the light beam to each of the first deflection surface and the second deflection surface at the same random number update period.

5. The optical scanning device according to claim 1, wherein when the assignment of the random number sequence for each light emitting part constituting the set of target light emitting parts is updated, the random number assignment part recognizes consecutive numbers in the order of generation by the random number generator for the initial random number sequence and the pseudo random number sequences, and assigns the random number sequences of the number according to an arithmetic progression specified for each light emitting part constituting the set of target light emitting parts to each light emitting part constituting the set of target light emitting parts, in which the arithmetic sequence has a tolerance set according to the random number update period.

6. An image forming apparatus comprising:

the optical scanning device according to claim 1;

the image carrier; and an image forming unit which forms an image corresponding to the electrostatic latent image on a sheet.

\* \* \* \* \*